(12) United States Patent
Jeon et al.

(10) Patent No.: US 9,898,819 B2
(45) Date of Patent: Feb. 20, 2018

(54) SYSTEM AND METHOD FOR DETECTING REGION OF INTEREST

(71) Applicant: Samsung Electronics Co., Ltd., Suwon-si (KR)

(72) Inventors: Joo Hyuk Jeon, Yongin-si (KR); Yeong Kyeong Seong, Yongin-si (KR); Kyoung Gu Woo, Seoul (KR); Baek Hwan Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 14/688,527

(22) Filed: Apr. 16, 2015

(65) Prior Publication Data

US 2015/0302583 A1 Oct. 22, 2015

(30) Foreign Application Priority Data

Apr. 18, 2014 (KR) ................. 10-2014-0046866

(51) Int. Cl.
*G06K 9/00* (2006.01)
*G06T 7/00* (2017.01)
*G06T 7/70* (2017.01)

(52) U.S. Cl.
CPC ............. *G06T 7/0016* (2013.01); *G06T 7/70* (2017.01); *G06T 2207/10132* (2013.01); *G06T 2207/20076* (2013.01); *G06T 2207/30096* (2013.01)

(58) Field of Classification Search
CPC .............. G06T 7/004; G06T 7/0016; G06T 2207/10132; G06T 2207/20076; G06T 2207/30096
See application file for complete search history.

(56) References Cited

U.S. PATENT DOCUMENTS

| 5,776,066 A * | 7/1998 | Nock ................. A61B 8/08 600/443 |
| 6,942,618 B2 * | 9/2005 | Simopoulos ......... A61B 6/5217 600/437 |
| 6,944,330 B2 | 9/2005 | Novak et al. |
| 7,992,100 B2 | 8/2011 | Lundstrom et al. |

(Continued)

FOREIGN PATENT DOCUMENTS

| JP | 2002-095640 A | 4/2002 |
| JP | 2006-280768 A | 10/2006 |

(Continued)

OTHER PUBLICATIONS

Dalal, Navneet, and Bill Triggs. "Histograms of Oriented Gradients for Human Detection." Computer Vision and Pattern Recognition, 2005. CVPR 2005. IEEE Computer Society Conference on. vol. 1. IEEE, 2005. San Diego, CA, United States.

(Continued)

*Primary Examiner* — Jonathan S Lee
(74) *Attorney, Agent, or Firm* — Jefferson IP Law, LLP

(57) ABSTRACT

Disclosed is region of interest (ROI) detection apparatus and method. The ROI detection apparatus includes: a selecting criterion acquirer configured to acquire a selecting criterion; an image receiver configured to receive a current image; a suspicious area selector configured to select a part of the current image as a suspicious area according to the selecting criterion; and an ROI detector configured to detect an ROI from the suspicious area.

26 Claims, 19 Drawing Sheets

(56) References Cited

U.S. PATENT DOCUMENTS

| | | |
|---|---|---|
| 8,051,386 B2 | 11/2011 | Rosander et al. |
| 8,156,210 B2 | 4/2012 | Metz et al. |
| 8,160,341 B2 | 4/2012 | Peng et al. |
| 8,265,355 B2 | 9/2012 | Zhao et al. |
| 9,412,167 B2* | 8/2016 | Tsui ................ G06T 7/0034 |
| 2005/0285853 A1 | 12/2005 | Morita et al. |
| 2006/0092315 A1* | 5/2006 | Payonk ............. A61B 5/0071 348/370 |
| 2006/0251306 A1* | 11/2006 | Shin .................. G06T 7/206 382/128 |
| 2008/0058593 A1 | 3/2008 | Gu et al. |
| 2008/0072151 A1* | 3/2008 | Song ................. G06F 3/0481 715/708 |
| 2008/0154123 A1 | 6/2008 | Jackson et al. |
| 2009/0021475 A1 | 1/2009 | Steinle et al. |
| 2009/0202179 A1* | 8/2009 | Shivanna .......... G06F 19/321 382/311 |
| 2011/0137170 A1* | 6/2011 | Yang ................. G06T 5/002 600/443 |
| 2012/0172726 A1* | 7/2012 | Sakai ................ A61B 8/00 600/443 |
| 2013/0245428 A1* | 9/2013 | Banjanin ........... A61B 8/4245 600/424 |
| 2015/0089411 A1* | 3/2015 | Ban .................. G06F 3/0486 715/765 |
| 2015/0148657 A1* | 5/2015 | Shashar ............. A61B 8/0866 600/408 |
| 2016/0019441 A1* | 1/2016 | Ryu .................. A61B 8/5207 382/131 |
| 2016/0077665 A1* | 3/2016 | Paek ................. G06F 3/04883 345/173 |
| 2016/0171708 A1* | 6/2016 | Kim .................. G06T 7/11 382/128 |

FOREIGN PATENT DOCUMENTS

| | | |
|---|---|---|
| JP | 2007-117168 A | 5/2007 |
| JP | 2008-245981 A | 10/2008 |
| KR | 10-1287382 B1 | 7/2013 |

OTHER PUBLICATIONS

Hou, Xiaodi, and Liqing Zhang. "Saliency Detection: A Spectral Residual Approach." Computer Vision and Pattern Recognition, 2007. CVPR'07. IEEE Conference on. IEEE, 2007. Minneapolis, MN, United States.

Kokkinos, Iasonas. "Bounding part scores for rapid detection with deformable part models." Computer Vision—ECCV 2012. Workshops and Demonstrations. Springer Berlin Heidelberg, 2012. Florence, Italy.

* cited by examiner

SYSTEM AND METHOD FOR DETECTING REGION OF INTEREST

CROSS-REFERENCE TO RELATED APPLICATION(S)

This application claims the benefit under 35 USC 119(a) of Korean Patent Application No. 10-2014-0046866, filed on Apr. 18, 2014, in the Korean Intellectual Property Office, the entire disclosure of which is incorporated herein by reference for all purposes.

BACKGROUND

1. Field

The following description relates to a Computer Aided Diagnosis (CAD) technique for ultrasonic images, and more particularly, to a Region of Interest (ROI) detecting technique for real-time CAD of ultrasonic images.

2. Description of Related Art

Generally, Computer Aided Diagnosis (CAD) on ultrasonic images is a technique of detecting, dividing, and diagnosing a Region of Interest (ROI) in order to provide a doctor or any user with ancillary information necessary for diagnosing a patient's lesion. For example, in a case of sliding window-based CAD, a characteristic pyramid is generated for the entire area of an image and an image analytic process, such as slide window-based matching, is implemented. However, an image analysis process takes a long time, making it difficult to implement real-time CAD which requires a diagnostic result thereof to be output almost at the same time when a corresponding image is photographed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a Region of Interest (ROI) detection apparatus including: a selecting criterion acquirer configured to acquire a selecting criterion; an image receiver configured to receive a current image; a suspicious area selector configured to select a part of the current image as a suspicious area according to the selecting criterion; and an ROI detector configured to detect an ROI from the suspicious area.

The selecting criterion acquirer may further comprise: an imaging mode selector configured to provide a user with imaging modes so that the user is enabled to select one of the imaging modes; an imaging mode output configured to output an imaging mode selected by the user; and an imaging mode receiver configured to receive the selected imaging mode output from the imaging mode output as the selecting criterion.

The selecting criterion acquirer may further comprise: a motion sensor configured to sense a speed of a probe which captures the current image; a probe speed output configured to output the speed sensed by the motion sensor; and a probe speed receiver configured to receive the speed output from the probe speed output as the selecting criterion.

The selecting criterion acquirer may further comprise: an image storage configured to store images that have been received before the current image; and a previous image acquirer configured to acquire a previous image that has been most recently received before the current image from the image storage as the selecting criterion.

The suspicious area selector may further comprise: an image divider configured to divide the current image into windows of predetermined size; a rank determiner configured to determine ranks of the windows; a number determiner configured to determine a number of windows to be selected according to the selecting criterion; and a window selector configured to select one or more of the windows as the suspicious area based on the determined ranks of the windows, wherein a number of the selected windows corresponds to the number of windows determined by the number determiner.

The selecting criterion may be an imaging mode designated by a user, and the number determiner may be further configured to determine a numeric value predetermined to correspond to the imaging mode as the number of windows.

The selecting criterion may be a speed of an image capturing probe, the speed which is sensed by a motion sensor, and the number determiner may be further configured to determine a numeric value predetermined to correspond to the speed as the number of windows.

The number determiner may be further configured to determine a numeric value predetermined to be in inverse proportion to the speed as the number of windows.

The suspicious area selector may further comprise: a size determiner configured to determine a size of a window to be selected based on the selecting criterion; an image divider configured to divide the current image into windows of the size determined by the size determiner; a rank determiner configured to determine ranks of the windows; and a window selector configured to select a top-ranked window from among the windows as the suspicious area.

The selecting criterion may be an imaging mode designated by a user, and the size determiner may be further configured to determine a size predetermined to correspond to the imaging mode as the size of the windows.

The selecting criterion may be a speed of a probe, the speed which is sensed by a motion sensor, and the size determiner may be further configured to determine a size that is predetermined to correspond to the speed as the size of the windows.

The size determiner may be further configured to determine a size predetermined to be in inverse proportion to the speed as the size of the windows.

The selecting criterion may be a previous image that has been received before the image, and the suspicious area selector may further comprise: an image divider configured to divide the current image into windows; an image comparer configured to determine a non-similarity level of size of an area in the current image, the area which is dissimilar with the previous image; a rank determiner configured to determine ranks of the windows according to the non-similarity level; and a window selector configured to select at least one of the windows as the suspicious area according to the ranks.

The rank determiner may be further configured to determine ranks of the windows in a manner that a window with a non-similarity level equal to or less than 0 or a predetermined value is ranked at a bottom.

In one general aspect, there is provided a method for detecting a Region of Interest (ROI), comprising: acquiring a selecting criterion; receiving a current image; determining a suspicious area by the selecting criterion; and detecting the ROI from the suspicious area.

Other features and aspects may be apparent from the following detailed description, the drawings, and the claims.

Figure 1:
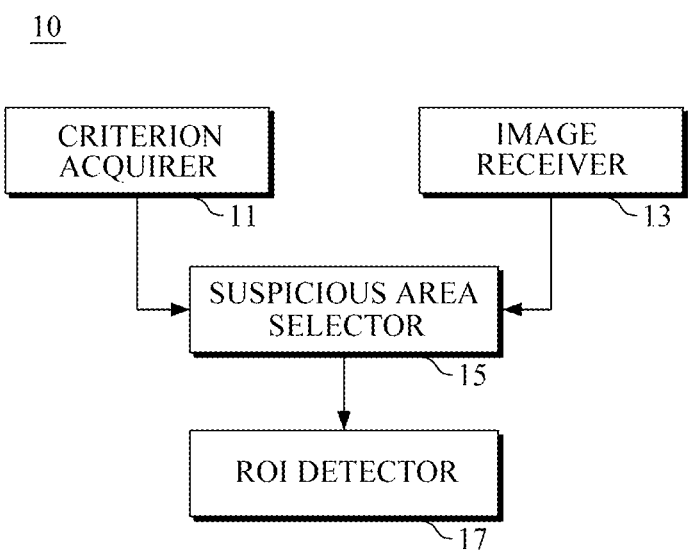
FIG. 1 is a block diagram illustrating an example of a Region of Interest (ROI) detection system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of well-known functions and constructions may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In real-time Computer-Aided Diagnosis (CAD), it takes a short time from capturing an ultrasonic image to completing CAD analysis, so a user may feel that an annalistic result of an image is output almost simultaneously with the imaging. Due to the trade-off relationship between annalistic time and diagnosis accuracy, sophisticated analysis may improve diagnosis accuracy but takes a long time from imaging to output an annalistic image. On the other hand, simple analysis may degrade diagnosis accuracy but shortens a period of time between imaging and outputting an annalistic image.

CAD analysis of an ultrasonic image is performed as follows: an ultrasonic image is received from an ultrasonic image capturing device; a Region of Interest (ROI) is detected from the received image; the detected ROI is divided; and a probability of a lesion to be present in each divided part of the ROI is calculated. Generally, it takes a long time to detect an ROI from an image during the CAD analysis. For example, in a case where a sliding window technique is employed in the CAD analysis, time for detecting an ROI from an image may account for about 90% of the whole analysis time. Thus, the analysis time may increase or decrease depending on the level of complexity used to implement the process of detecting an ROI.

According to an embodiment, there is proposed an adaptive ROI detecting technique, which detects a user's diagnostic intention simultaneously with an imaging, and enables an ROI detecting process to be adapted according to the user's detected diagnostic intention, and a real-time adaptive CAD technique.

In general, an ultrasonic image photographing equipment for a purpose of medical diagnosis is mainly composed of a probe and a main body for processing a signal transmitted from the probe. The probe may radiate a signal into a human body, but is not limited thereto, and thus the probe may radiate the signal into any body, and receive a reflected signal. The human body may receive the signal from the probe and convert the received signal into an image representing an inner space of the human body. For example, a doctor places a probe onto a specific spot on the body surface of a patient on whom ultrasonic image diagnosis needs to be performed. Then, the probe may capture an ultrasonic image by radiating an ultrasonic signal into the inner space of the body of the patient and receiving an ultrasonic signal reflected from the inner space of the body of the patient. A probe may be a device that is manually moved by a user of the probe. Therefore, an image captured by the probe may be acquired in a different way according to a diagnostic intention of the user who moves the probe.

For example, when a doctor captures an ultrasonic image to diagnose breast cancer, the ultrasonic image may be captured at a location where a lesion, such as a tumor, is less likely to be found. In such a case, the user of the probe may capture the ultrasonic image with a passive diagnostic intention to confirm that a lesion does not exist at the location. Thus, the user may move a probe relatively quickly in a low-density mode that enables the user of the probe to capture a fewer number of images relative to the same probe moving distance. In general, a probe is configured to photograph a fixed number of images at predetermined time intervals. Accordingly, the more rapidly the user moves the probe, the less images the probe may capture within a predetermined moving distance. Thus, adjacent images may include areas relatively distant from one another.

In another example, when a doctor captures an image at a location where a lesion is highly likely to be found, an ultrasonic image may be photographed with a higher degree of diagnostic intention interest. The doctor may move the probe relatively slowly in a high-density mode that enables the doctor to capture a large number of images relative to the same probe moving distance. Among images captured in this manner, temporally adjacent images may include areas relatively adjacent to one another.

A user's diagnostic intention may be detected differently, not using a probe speed. For example, by setting an imaging mode of an ultrasonic image, a user may designate a diagnostic intention manually. This may be more useful when an ultrasonic probe is inserted into a human body to capture an image, rather than when the ultrasonic probe is moved on the surface of a human body.

In another example, a user's diagnostic intention may be detected by comparing the current image and a previous image that was processed just before the current image. That is, if the previous image and the current image are images of areas that are adjacent to each other, a similarity between the two images may be very high. In this case, an active diagnostic intention for discovering a lesion may be detected. On the other hand, if the previous image and the current image are images of areas that are spatially distant from each other, a similarity between the two images may not be high. In this case, a passive diagnostic intention for identifying merely the non-existence of a lesion may be detected.

As such, images may be captured in different ways according to a user's diagnostic intention. In addition, the user's level of interest in an image depends on the diagnostic intention, so the user may feel that different lengths of time are required to obtain a result of real-time CAD on each image. For example, in a case where a user captures an image of an area in which the user does not suspect a lesion to exist, the user looks over the image with a relatively low level of attention, and thus the user, may expect that a diagnostic result thereof would be output within a relatively short period of time. In another example, in a case where a user captures an image of an area in which the user suspects a lesion to exist, the user may pay close attention in order to discover the existence of the lesion, and thus the user, may not care how long it takes until a diagnostic result is output.

According to an exemplary embodiment, the ROI detection system or apparatus and method may provide, according to an example, an adaptive real-time CAD technique by employing an ROI detection process that is differently adapted according to a user's diagnostic intention. The adaptive real-time CAD technique may yield a diagnostic result through an annalistic process that is differently adapted according to the user's diagnostic intention. The annalistic process, differently adapted according to the user's diagnostic intention, may require different lengths of time.

For example, in a case where an image is captured with a passive diagnostic intention that aims to confirm the nonexistence of a lesion, a simpler annalistic process may be adapted to output a diagnostic result more quickly. In another example, in a case of an active diagnostic intention aiming to confirm the existence of a lesion, a more sophisticated annalistic process may be adapted to output a diagnostic result more slowly.

Accordingly, the ROI detection system and method may separate an ROI detection process into two processes; the first process for selecting an area in an image as a suspicious area in which a lesion is highly likely to be discovered, and the second process for detecting an ROI from the suspicious area.

Information indicative of a user's diagnostic intention may be used as a selecting criterion for selecting a suspicious area in the first process. The selecting criterion may include selecting parameters. Various diagnostic intentions may be defined to be distinguished by the selecting parameters.

According to an embodiment, selecting parameters may be input directly by a user. For example, when capturing an ultrasonic image using a probe, a user may designate one of imaging modes. For example, the imaging modes may be a low-density imaging mode, an intermediate-density imaging mode, and a high-density imaging mode. In addition, each of the imaging modes may be defined by different selecting parameters to represent different diagnostic intentions.

For example, a low-density imaging mode may be defined by selecting parameters corresponding to an intention of discovering the non-existence of a lesion (a passive diagnostic intention). An intermediate-density imaging mode may be defined by selecting parameters corresponding to an intermediate diagnostic intention that is in the middle between passive and active. A high-density imaging mode may be defined by selecting parameters corresponding to an intention of discovering existence of a lesion (an active diagnostic intention).

In this example, according to a diagnostic intention, a user may select one of the imaging modes which is included in an ultrasonic image equipment, and then may capture an image using a probe. For example, in a case of capturing an image in a high-density imaging mode, information indicative of the high-density imaging mode is transmitted along with the captured image from the ultrasonic image capturing equipment to an ROI detection system. The ROI detection system may use the received high-density imaging mode as a selecting parameter that represents the active diagnostic intention of discovering a lesion. According to the selecting parameter, a suspicious area of a predetermined size may be selected. The predetermined size enables a diagnostic result to be output relatively slowly through a more sophisticated annalistic process.

In the above example, the selecting criterion includes three selecting parameters distinguished by three imaging modes, but this is merely exemplary. According to an embodiment, it is obvious that a selecting criterion may include two, four, or more selecting parameters and that an infinite number of continuous selecting parameters may represent an infinite number of continuous imaging mode levels, respectively.

In a case of an ultrasonic image capturing equipment of which the probe is moved by a user using his/her hands, a diagnostic intention may be automatically determined by sensing the probe's speed (hereinafter referred to as a probe speed). This is because a probe speed usually differs according to a diagnostic intention of a user who moves the probe. In such a case, a probe speed may be automatically sensed by a motion sensor installed in the probe, such as an accelerometer, and the like. The sensed probe speed may be classified, for example, into speed states, such as low speed state, intermediate speed state, and high speed state. In addition, the speed states may be defined by different selecting parameters to represent different diagnostic intentions.

For example, a selecting parameter corresponding to a diagnostic intention for discovering a lesion may correspond to a low speed state. A selecting parameter representative of an intermediate diagnostic intention may correspond to an intermediate speed state. A selecting parameter representative of a passive diagnostic intention for confirming the non-existence of a lesion may correspond to a high speed state.

In this example, a user may capture an image by moving the probe including a motion sensor. Then, the motion sensor may sense the speed of the probe. For example, the sensed probe speed may be determined to be 'high'. Then, the sensed high speed and the captured image may be transmitted from an ultrasonic image capturing equipment to an ROI detection system. Then, the ROI detection system may use the received high speed as a selecting parameter representing a passive diagnostic intention that does not aim to discover a lesion. According to the selecting parameter, a suspicious area of a specific size may be selected, in which the specific size enables an annalistic result to be output quickly through a simpler annalistic process.

In the above example, the selecting criterion includes three selecting parameters distinguished by three levels of the probe speed, but this is merely exemplary. According to an example, it is obvious that a selecting criterion may include two, four or more selecting parameters and further the selecting criterion may be represented by parameters of graduated sizes corresponding to consecutive levels of speed.

Further, a user's diagnostic intention may be determined by comparing a previous image and the current image in an ROI detection system. Herein, the "previous image" refers to an image that was analyzed immediately before the current image, and the "current image" refers to an image that is received for adaptive real-time CAD or for detection of an ROI during the current annalistic process. Information on a previous image may be stored in the ROI detection system for later use while a corresponding image is processed.

The previous and current images may be compared by comparing a brightness of the images on a pixel-by-pixel basis or by converting a brightness of each of the images into an arbitrary characteristic value and then comparing characteristic values between the images.

Through the comparison, an area in the current image may be identified as the same as an area included in the previous image, whereas another area in the current image may be identified as different from an area included in the previous image. Size for the area that is identified as different from that of the previous image may represent non-similarity between the two images, and non-similarity may correspond to a user's diagnostic intention. For example, non-similarity between the two images may be classified into levels, such as a high level, a middle level, and a low level. In addition, different selecting parameters representing different diagnostic intentions may be preset for non-similarity levels. For example, a selecting parameter representing a highly interested diagnostic intention may be set for a low non-similarity level; a selecting parameter representing an intermediate diagnostic intention may be set for a middle non-similarity level; and a selecting parameter representing a passive diagnostic intention may be set for a high non-similarity level.

In this example, a user may repeatedly perform analytical processing on successively captured ultrasonic images for real-time CAD or detection of an ROI. Accordingly, the currently processed image (i.e., the current image) and an image most recently processed (i.e., the previous image) are compared to calculate a non-similarity level. For example, a calculated non-similarity level may be determined to be an "average level". Then, the average non-similarity level may be used as a selecting parameter representing an intermediate diagnostic intention that is in the middle between a passive diagnostic intention and an active diagnostic intention. According to the selecting parameter, a suspicious area of a specific size may be selected. The specific size enables a diagnostic result to be output at an intermediate speed through an annalistic process that is at an intermediate-level in complexity.

In the above example, the selecting criterion includes three selecting parameters distinguished by three non-similarity levels. However, this is merely exemplary, and it is obvious that a selecting criterion may include two, four, or more selecting parameters and may be represented by consecutive selecting parameters corresponding to a non-similarity level. The selecting criterion may further be represented by selecting parameters of graduated sizes corresponding to consecutive non-similarity levels.

Meanwhile, among an ROI detecting process, a dividing process and a diagnosing process in sliding window-based CAD, the ROI detecting process may account for more than 90% of the entire analysis time. Thus, in a case of employing sliding window-based CAD adapting an analytical process for detection of an ROI according to a user's diagnostic intention, it may be possible to implement an adaptive real-time CAD system and method which may output a diagnostic result that requires different analytical time and has different quality according to the user's diagnostic intention.

Hereinafter, examples of a Region of Interest (ROI) detection system are described with reference to FIGS. 1 to 11. However, they are merely exemplary, and it may be understood for those skilled in the art that different systems and methods with various combinations are possible within the scope of the following claims. Components of an ROI detection system may be implemented by hardware including circuits that executes functions of the components. In addition, components of an ROI detection system may be implemented by computer-implementable software, which performs a specific task once it is implemented by a processor of a computing device, firmware, hardware or a combination thereof.

In addition, there are provided descriptions about examples in which major components of an ROI detection system is implemented in an additional device different from an ultrasound imaging device. However, it may be understood for those skilled in the art that all components of an ROI detection system may be included in an ultrasound imaging device or an additional device.

FIG. 1 is a block diagram illustrating an example of a Region of Interest (ROI) detection device or system.

Referring to FIG. 1, there is provided an example of an ROI detection system 10 which may be part of a Computer-Aided Diagnosis (CAD) system that detects, divides, and diagnoses an ROI from an ultrasonic image.

The ROI detection system selects part of an image as a suspicious area, detects an ROI from the selected suspicious area, and adjusts a size or a location of the suspicious area according to a selecting criterion corresponding to a user's diagnostic intention. The ROI detection system 10 may include components, such as for example a selecting criterion acquirer 11, an image receiver 13, a suspicious area selector 15, and an ROI detector 17. Although FIG. 1 illustrates the selecting criterion acquirer 11, the image receiver 13, the suspicious area selector 15, and the ROI detector 17 included in the ROI detection system, these components may be embodied as independent hardware. Therefore, the ROI detection system 10 is not limited to the one illustrated in FIG. 1 and thus may include more or less components.

The selecting criterion acquirer 11 is a component configured to acquire a selecting criterion. The selecting criterion is information that is used as a standard for selecting a part of an image as a suspicious area. A user's diagnostic intention may include various purposes, for example, discovering an ROI and confirming that there is no ROI in an image. Such various diagnostic intentions may be represented by different selecting parameters. Thus, a selecting criterion may be predetermined and include selecting parameters, and the selecting criterion acquirer 11 may select one of the selecting parameters.

According to an embodiment, the user may set an imaging mode, speed of an image capturing probe, which is detected by a sensor, or similarity between the current image and a previous image. The selecting criterion acquirer 11 may acquire a selecting criterion by receiving information corresponding to the selecting criterion from an external imaging device or an image capturing probe over a wired/wireless communication. In addition, the selecting criterion acquirer 11 may acquire a selecting criterion by reading the selecting criterion stored in the storage of a local system.

For example, in a case of an ultrasonic imaging device, a user's diagnostic intention may be determined by detecting a probe speed. The probe speed may be detected by a sensor included in the probe to be determined to be one of a low speed state, an intermediate speed state, or a high speed state. The low speed state, intermediate speed state, and high speed state may be defined by different selecting parameters that indicate an active diagnostic intention, an intermediate diagnostic intention, and a passive diagnostic intention. The selecting criterion acquirer 11 may receive the detected probe speed state and determine the received speed state as 'a low speed state.' Then, the selecting criterion acquirer 11 may transmit the determined low speed state to the suspicious area selector 15 as selecting parameters of active diagnostic intention that has been limited in advance. According to the diagnostic process, the suspicious area selector 15 may select a suspicious area of a predetermined size according to a selecting parameter corresponding to the active diagnostic intention received from the selecting criterion acquirer 11, and the predetermined size may cause delay in output of a diagnostic result. The image receiver 13 is a component for receiving an image. The image may be an ultrasonic image captured for ultrasound diagnosis. Immediately after an image is captured, the image may be transmitted from an imaging device to the image receiver 13 of the ROI detection system over a wired/wireless network.

The suspicious area selector 15 may select, for example, a part of the received image as a suspicious area according to a selecting criterion received from the selecting criterion acquirer 11. The selection of a part in an image as a suspicious area is made based on the selecting criterion acquired by the selecting criterion acquirer 11. In addition, a suspicious area may be selected by taking into consideration not just a selecting criterion but also accuracy in diagnosis. A selecting criterion is merely a standard for selecting a suspicious area from an image according to a user's diagnostic intention. Thus, in order to enhance accuracy in a diagnosis, an area that is likely to include an ROI in an image needs to be discovered.

To discover an area that is likely to include an ROI, the suspicious area selector 15 may divide an image into windows, and calculate an ROI presence probability of an ROI to be present in each window by analyzing the windows. Then, the suspicious area selector 15 may be configured to determine the ranks of the windows based on the ROI presence probabilities therefor. Alternatively, the suspicious area selector 15 may be configured to determine the ranks of the windows by a selecting criterion. The selecting criterion may be used as a standard for determining the number of windows to be selected as a suspicious area and size thereof.

The ROI detector 17 is a component that may be configured to detect an ROI from a suspicious area. The ROI detector 17 may be a component that detects an ROI by analyzing a suspicious area. On the other hand, an ROI detection component in a conventional CAD system analyzes the entire area of an image.

For example, the ROI detector 17 may detect an ROI from a suspicious area using a sliding window technique. In this example, the ROI detector may be performing annalistic process, for example, by generating a feature pyramid area, not in the entire area of an image, but a selected suspicious image thereof, and by sliding a model window to match the feature pyramid area. The time required for the annalistic process may depend on the number of windows and the number of pyramid areas. In the case where the same annalistic technique is used, less time is required for a smaller size of a suspicious area. Thus, in the embodiment of FIG. 1, the time required for the annalistic process may be reduced since the animistic process is performed on a suspicious area that is smaller than the entire image. However, an ROI may exist in any area not selected as a suspicious area in the image, so a detection result obtained only from the suspicious area may be less accurate, compared to a detection result obtained from the entire image.

However, by adapting a different annalistic process for detecting an ROI according to a user's diagnostic intention, the ROI detection system 10 may adjust the tradeoff between a time required for the analysis and an accuracy in the diagnosis. In other words, if a user wants a simple diagnosis, the ROI detection system 10 adjusts an annalistic process to achieve an annalistic result relatively quickly despite relatively poor accuracy in the diagnosis. Alternatively, if a user wants a thorough diagnosis, the ROI detection system 10 adjusts an annalistic process to achieve an annalistic result relatively slowly with a relatively high accuracy in the diagnosis. Accordingly, there may be provided an adaptive ROI detecting technique that may meet a user's satisfaction and perform real-time CAD.

Figure 2:
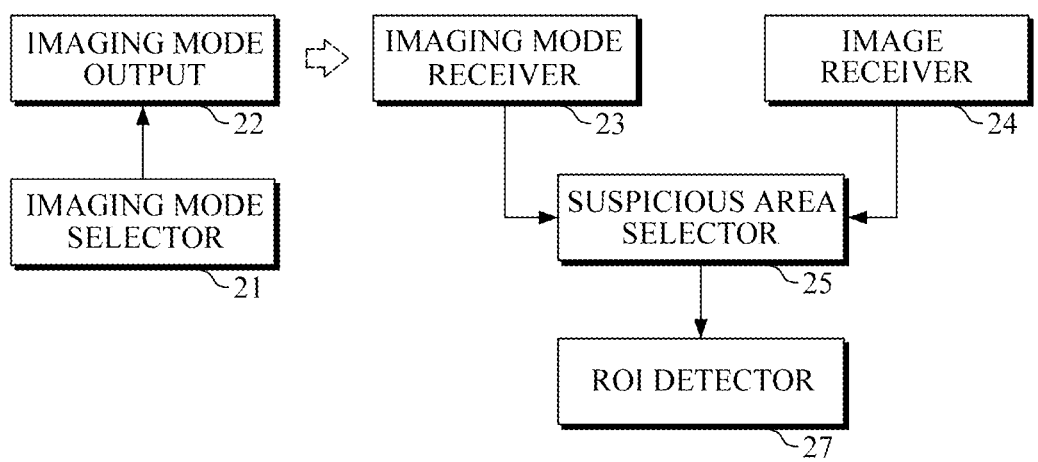
FIG. 2 is a block diagram illustrating another example of an ROI detection system.

FIG. 2 is a block diagram illustrating another example of an ROI detection apparatus or system.

Referring to FIG. 2, there is provided an example of an ROI detection system 20 which uses an imaging mode designated by a user as a suspicious area selecting criterion. The ROI detection system 20 may include components, such as an imaging mode selector 21, an imaging mode output 22, an imaging mode receiver 23, an image receiver 24, a suspicious area selector 25, and an ROI detector 27. Although FIG. 2 illustrates the imaging mode selector 21, the imaging mode output 22, the imaging mode receiver 23, the image receiver 24, the suspicious area selector 25, and the ROI detector 27 included in the ROI detection system 20, these components may be embodied as independent hardware. Therefore, the ROI detection system 20 is not limited to the one illustrated in FIG. 2 and thus may include more or less components.

Herein, there is provided an example in which the imaging mode selector 21 and the imaging mode output 22 are included in an ultrasonic imaging device and other components 23, 24, 25 and 27 are included in an additional device different from the ultrasonic image capturing device. However, it may be understood for those skilled in the art that all the components of the ROI detection system 20 may be included in an ultrasonic imaging device or in an additional device.

In FIG. 2, the imaging mode selector 21, the imaging mode output 22, and the imaging mode receiver 23 are components corresponding to the selecting criterion acquirer 11 shown in the embodiment of FIG. 1. FIG. 2 illustrates an example in which a selecting criterion is imaging mode information.

The imaging mode selector 21 may be a component that is provided to enable a user to select one of imaging modes that are predetermined as selecting parameters of a selecting criterion. Various imaging modes may be used as long as they represent a user's diagnostic intention. For example, the imaging modes may be defined as several modes, such as the first mode, the second mode and the third mode, or a high-density mode, a medium-density mode, and a low-density mode, according to the user's diagnostic intention. In addition, imaging modes may be defined as relatively continuous levels which are able to be selected in a range of from 1 to 100. A selecting parameter indicating a diagnostic intention may correspond to each imaging mode level.

For example, an ultrasonic image capturing device may include a computing device that includes a processor, a memory, a display, and a user inputting device. The processor of the computing device may display predefined and pre-stored imaging modes on a display and prompt a user to select one of the imaging modes. In response to the prompt, the user may select an imaging mode that is considered most representative of the user's diagnostic intention.

An imaging mode selected by the user may be output by the imaging mode output 22 and received by the imaging mode receiver 23 as a selecting parameter. The imaging mode output and the imaging mode receiver 23 may be connected to each other over a bus network that connects components of a computing device for data communication, but is not limited thereto. For example, the imaging mode output 22 and the imaging mode receiver 23 may be connected to each other over a wired communication network, a wireless communication network, a short range communication network, a broadband communication network, or the like.

The imaging mode receiver 23 is a component that receives an imaging mode output from the imaging mode output 22. The image receiver 24 is a component that receives an image that is captured on an imaging mode received by the imaging mode receiver 23. The received photographic mode and image are transmitted to the suspicious area selector 25. The suspicious area selector 25 is a component that selects part of an image as a suspicious area based on an imaging mode by taking into consideration accuracy in diagnosis.

An imaging mode is merely a standard for determining a size of a suspicious area according to a diagnostic intention. Thus, for high accuracy in diagnosis, it is necessary to discover an area that is highly likely to include an ROI in an area. In order to discover an area that is likely to include an ROI, the suspicions area selector 25 may divide an image into windows and calculate an ROI presence probability of an ROI to be present in each window by analyzing the windows. Then, the suspicious area selector 25 may determine the ranks of the windows to be selected as a suspicious area. According to the ranks of the windows, a specific number of windows or any window of specific size may be selected as an ROI. The imaging mode may be used as a standard for determining the number of windows to be selected as a suspicious area or size thereof.

Similarly to the ROI detector 17, the ROI detector 27 may be a component that detects an ROI from a suspicious area selected by the suspicious area selector 25.

As described above, the ROI detection system 20 may adapt a different annalistic process according to imaging mode information indicating a user's diagnostic intention, thereby possibly providing a real-time CAD technique that meets the user's satisfaction.

Figure 3:
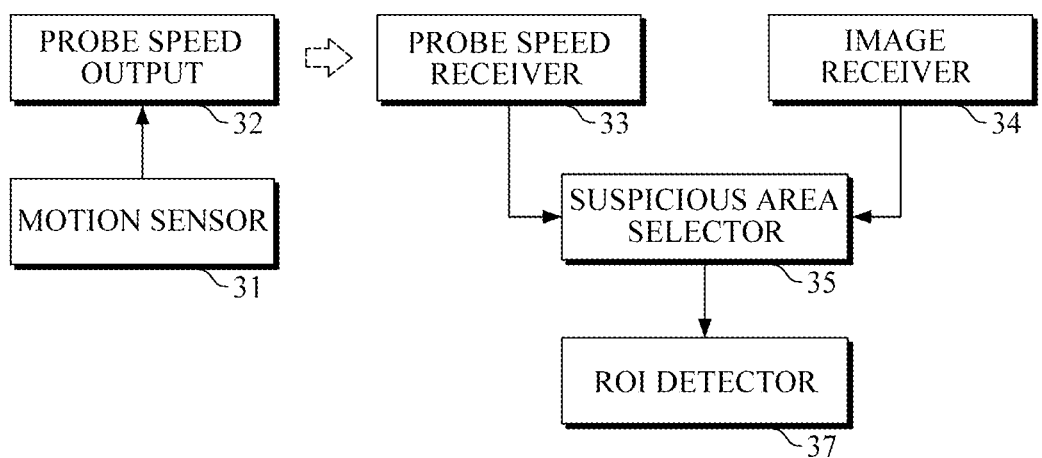
FIG. 3 is a block diagram illustrating another example of an ROI detection system.

FIG. 3 is a block diagram illustrating another example of an ROI detection apparatus or system.

Referring to FIG. 3, there is provided an example of an ROI detection system 30 which uses a probe speed detected by a sensor as a selecting criterion. The ROI detection system 30 may include components such as a motion sensor 31, a probe speed output 32, a probe speed receiver 33, an image receiver 34, a suspicious area selector 35, and an ROI detector 37. Although FIG. 3 illustrates the motion sensor 31, the probe speed output 32, the probe speed receiver 33, the image receiver 34, the suspicious area selector 35, and the ROI detector 37 included in the ROI detection system, these components may be embodied as independent hardware. Therefore, the configuration of the ROI detection system 30 illustrated in FIG. 3 is not limited thereto and the ROI detection system 30 may include more or less components.

In this example, the motion sensor 31 and the probe speed output 32 are included in an ultrasonic image capturing equipment. Meanwhile, components 33, 34, 35, and 37 are included in an additional device different from the ultrasonic image capturing equipment. However, it may be understood for those skilled in the art that all of the components of the ROI detection system 30 may be included in the ultrasonic image capturing equipment.

The motion sensor 31, the probe speed output 32, and the probe speed receiver 33 are components corresponding to the selecting criterion acquirer 11 shown in the embodiment of FIG. 1.

The motion sensor 31 may include a sensor for detecting speed, such as an accelerometer, and may be included in a probe. Herein, a "probe" may refer to a device that captures an ultrasonic image in a manner that the user holds up and moves the device in contact with a surface of a human body.

A probe speed detected by the motion sensor 31 may be defined using several stages, such as the first speed, the second speed, and the third speed, or a high speed, an intermediate speed, and a low speed, according to a diagnostic intention. Alternatively, a probe speed may be defined as a relatively continuous level within a range of between 1 and 100. Each speed level may correspond to a selecting parameter of a selecting criterion, which is defined according to a diagnostic intention.

A probe speed detected by the motion sensor 31 may be output by the probe speed output 32 and then received by the probe speed receiver 33 as a selecting criterion. The probe speed output 32 and the probe speed receiver 33 may be connected over a bus network that connects components of one computing device so that the components may be enabled to perform data communication but is not limited thereto. For example, the probe speed output 32 and the probe speed receiver 33 may be connected over a wired, wireless, short-range or broadband communication network for data communication.

The probe speed receiver 33 is a component that receives probe speed output from the probe speed output 32 as a selecting parameter. Meanwhile, the image receiver 34 is a component that receives an image captured by a probe which moves at a speed received by the probe speed receiver 33. The received speed and image are transmitted to the suspicious area selector 35. The suspicious area selector 35 is a component that selects part of an image as a suspicious area based on probe speed by taking into account accuracy in the diagnosis.

Probe speed is merely a standard used for determining a size of a suspicious area according to diagnostic intention. Thus, for improved accuracy in diagnosis, it is preferable but not necessary to select an area that is highly likely to include an ROI in an image. In order to discover an area highly likely to include an ROI, the suspicious area selector 35 may divide an area into windows and calculate an ROI presence probability of an ROI to be present in each window by analyzing the windows. Then, according to the ROI presence probability, the suspicious area selector 35 may determine the ranks of the windows to be selected as a suspicious area. The probe speed may be used as a standard for determining the number of windows to be selected as a suspicious area and size therefor.

Similarly to the ROI detector 17 in FIG. 1, the ROI detector 37 may be a component that detects an ROI from a suspicious area selected by the suspicious area selector 35.

As described above, the ROI detection system 30 in FIG. 3 is capable of adapting a different annalistic process for detecting an ROI based on speed information of an image capturing probe, which indicates a user's diagnostic intention, thereby possibly providing a real-time CAD technique that meets the user's satisfaction.

Figure 4:
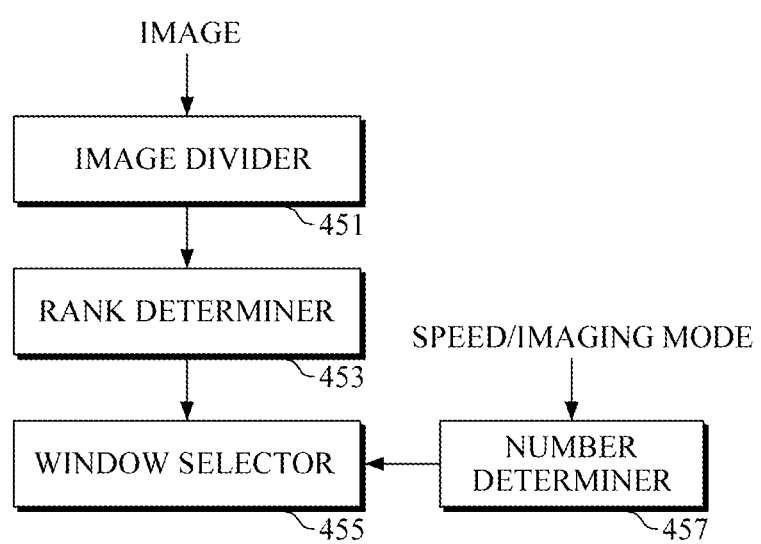
FIG. 4 is a block diagram illustrating an example of a suspicious area selector shown in FIGS. 1 to 3.

FIG. 4 is a block diagram illustrating an example of a suspicious area selector shown in FIGS. 1, 2 and 3.

Referring to FIG. 4, there is provided an example of a suspicious area selector 45 that uses probe speed or an imaging mode as a standard for determining the number of windows to be selected. The suspicious area selector 45 may include components such as an image divider 451, a rank determiner 453, a window selector 455, and a number determiner 457. Although FIG. 4 illustrates the suspicious area selector 45 including the image divider 451, the rank determiner 453, the window selector 455, and the number determiner 457, these components may be implemented as independent hardware. Therefore, the configuration of the suspicious area selector 45 illustrated in FIG. 4 is not limited and thus the suspicious area selector 45 may include more or less components.

The image divider 451 is a component that divides an image into windows, that is, N number of windows, of a predetermined size. A window refers to a partial area in an image, and two windows may include the same overlapping area. In addition, each window may have a same size. Such a window division method is well known in various image annalistic techniques, such as a sliding window technique.

The rank determiner 453 is a component that determines the ranks of N number of windows. Windows are ranked from first to N-th. The ranks of windows may be used without limitation as long as each ranking indicates a probability that an ROI may be detected in a corresponding window.

The technique of determining the ranks of windows is well known. For example, the ranks of windows may be determined by a product sum between a predetermined filter and feature vectors included in each window. Herein, a filter may be calculated simply by applying, to training data, a learning algorithm, such as Support Vector Machine (SVM), Artificial Neural Network (ANN), or the like.

The number determiner 457 is a component that determines the number (e.g., K number) of windows to be selected as a suspicious area, according to a selecting criterion such as probe speed or an imaging mode. If an obtained selecting parameter indicates a relatively active diagnostic intention, a relatively great number of windows may be determined to be a suspicious area. On the other hand, if an obtained selecting parameter indicates a relatively passive diagnostic intention, a relatively small number of windows may be determined to be a suspicious area.

The window selector 455 is a component that selects K number of windows from among N number of windows as a suspicious area based on the determined ranks of windows, wherein K is determined by the rank determiner 453.

A size of a suspicions area may be adjusted by adjusting the number of windows in an image according to a diagnostic intention, thereby prolonging or reducing the analysis time for detecting an ROI.

Figure 5:
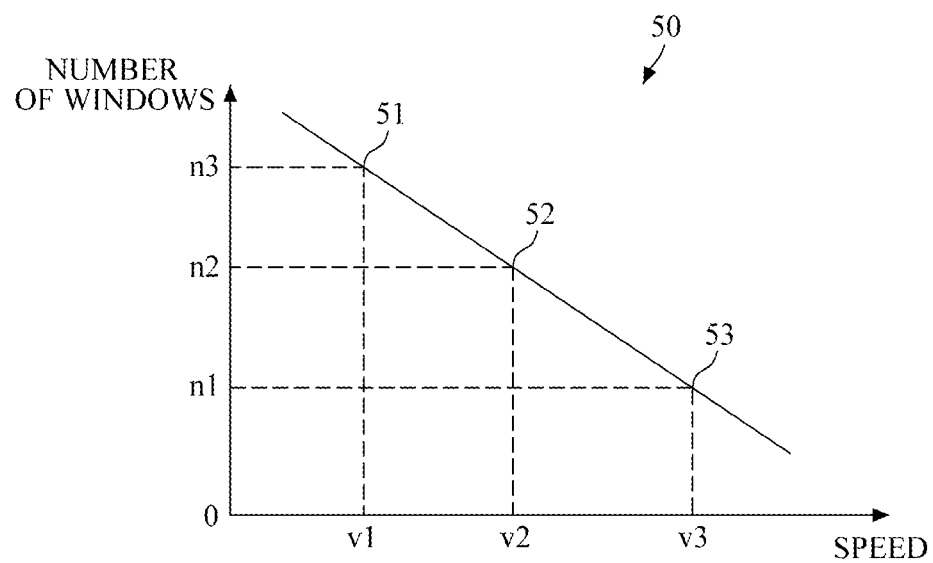
FIG. 5 is a graph illustrating a relationship between probe speed and the number of windows determined by the number determiner in FIG. 4 based on the probe speed.

FIG. 5 is a graph illustrating a relationship between probe speed and the number of windows determined by the number determiner in FIG. 4 based on the probe speed.

Referring to FIG. 5, there is provided a relationship between the probe speed and the number of windows to be selected based on the probe speed. The number of windows to be selected as suspicious areas (e.g., n1, n2 and n3) may be in inverse proportion 50 to a magnitude of the speed (e.g., v1, v2 and v3) such that, as the selected number of windows increases, the value of the speed is reduced. At three points 51, 52 and 53 with respective velocities v1, v2 and v3, the number of windows is reduced to n1, n2 and n3 in sequence. That is, if the number of selected windows is small, the size of a suspicious area is also small. In other words, if a user captures an image by moving a probe relatively quickly (at v3), it indicates a passive diagnostic intention of a simple check, and accordingly, a small suspicious area (n1) may be selected. Alternatively, if a user captures an image by moving a probe relatively slowly (at v1), it indicates an active diagnostic intention for a more detailed check, and accordingly, a large suspicious area (n3) may be selected. In the graph of FIG. 5, the inverse proportion 50 is in a form of a monotone decreasing straight line, but it is merely exemplary, and it may be understood that an inverse proportion may be in various forms, such as a curve of secondary degree and stairs.

Figure 6:
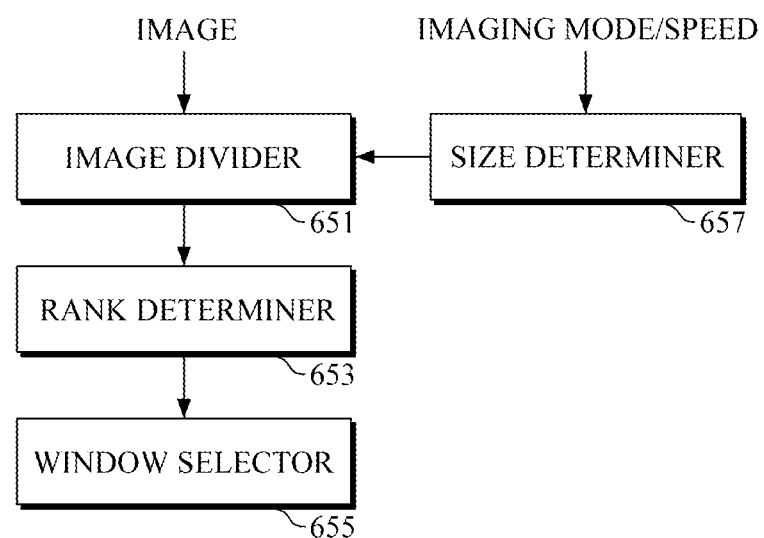
FIG. 6 is a diagram illustrating another example of a suspicious area selector shown in FIGS. 1 to 3.

FIG. 6 is a block diagram illustrating another example of a suspicious area selector shown in FIGS. 1, 2, and 3.

Referring to FIG. 6, a suspicious area selector 65 that uses probe speed and an imaging mode to determine size for windows to be selected as a suspicious area is provided. The suspicious area selector 65 may include components such as an image divider 651, a rank determiner 653, a window selector 655, and a size determiner 657. Although FIG. 6 illustrates the image divider 651, the rank determiner 653, the window selector 655, and the size determiner 657 included in the suspicious area selector 65, these components may be embodied as independent hardware. Therefore, the configuration of the suspicious area selector 65 illustrated in FIG. 6 is not limited thereto and thus the suspicious area selector 65 may include more or less components.

The size determiner 657 is a component that determines a size for the windows to be selected as a suspicious area (e.g. A width) according to a selecting criterion such as a probe speed or a photographic mode. If a selecting criterion indicates a relatively active diagnostic intention, the size determiner 657 may determine that a window to be selected as a suspicious area is relatively great in size. Alternatively, if a selecting criterion indicates a relatively passive diagnostic intention, the size determiner 657 may determine that a window to be selected as a suspicious area is relatively small in size.

Similarly to the image divider 451 in FIG. 4, the image divider 651 in FIG. 6 divides an image. However, the image divider 651 in FIG. 6 is still different from the image divider 451 in FIG. 4 in that the image divider 651 divides an image into windows of a size that is not predetermined, but determined by the size determiner. That is, the image divider 651 may divide an image into windows whose width is A, and whose number of windows is N.

Similarly to the rank determiner 453 shown in FIG. 4, the rank determiner 653 shown in FIG. 6 is a component that determines the ranks of N number of windows which are divided by the image divider 651 from an image. The window selector 655 is a component that selects a predetermined number of windows as a suspicious areas based on the ranks determined by the rank determiner 653. For example, a top-ranked window may be selected as a suspicious area.

According to the embodiment described above, the size of a suspicious area may be adjusted by adjusting the size for windows in an image according to diagnostic intention, thereby prolonging or reducing the analysis time for detecting an ROI.

Figure 7:
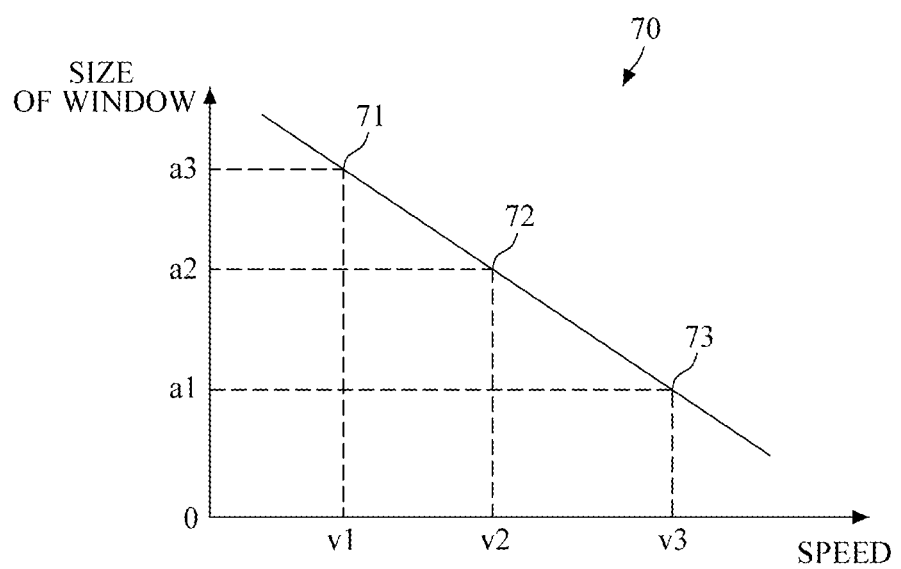
FIG. 7 is a graph illustrating a relationship between probe speed and a window's size determined by a size determiner in FIG. 6 based on the probe speed.

FIG. 7 is a graph illustrating a relationship between probe speed and a window's size determined by a size determiner in FIG. 6 based on the probe speed.

Referring to FIG. 7, a relationship between speed and a window's size determined by the speed is illustrated. Size a1, a2, and a3 of windows selected as a suspicious area may be in an inverse proportional relationship 70 with speed v1, v2, and v3. At three points 71, 72, and 73 with respective velocities v1, v2, and v3, the size of the windows is reduced to a3, a2, and a1 in sequence. That is, if the size of the windows is small, the size of a suspicious area may be also small. In other words, in a case where a user captures an image by moving a probe relatively quickly (corresponding to v3), a user's diagnostic intention is passive diagnostic intention for simple check, and accordingly, a small area (a1) may be selected as a suspicious area for analysis. Alternatively, in a case where a user captures an image by moving a probe relatively slowly (corresponding v1), a user's diagnostic intention is an active diagnostic intention for a thorough check to discover an ROI, and accordingly, a large area (a3) may be selected as a suspicious area for analysis. In FIG. 7, the inverse proportional relationship 70 is in a form of a monotone decreasing straight line, but this is merely exemplary and it may be understood that various inverse proportional relationships, such as a curve of secondary degree and stairs, are possible FIG. 8 is a block diagram illustrating another embodiment of a ROI detection system.

Figure 8:
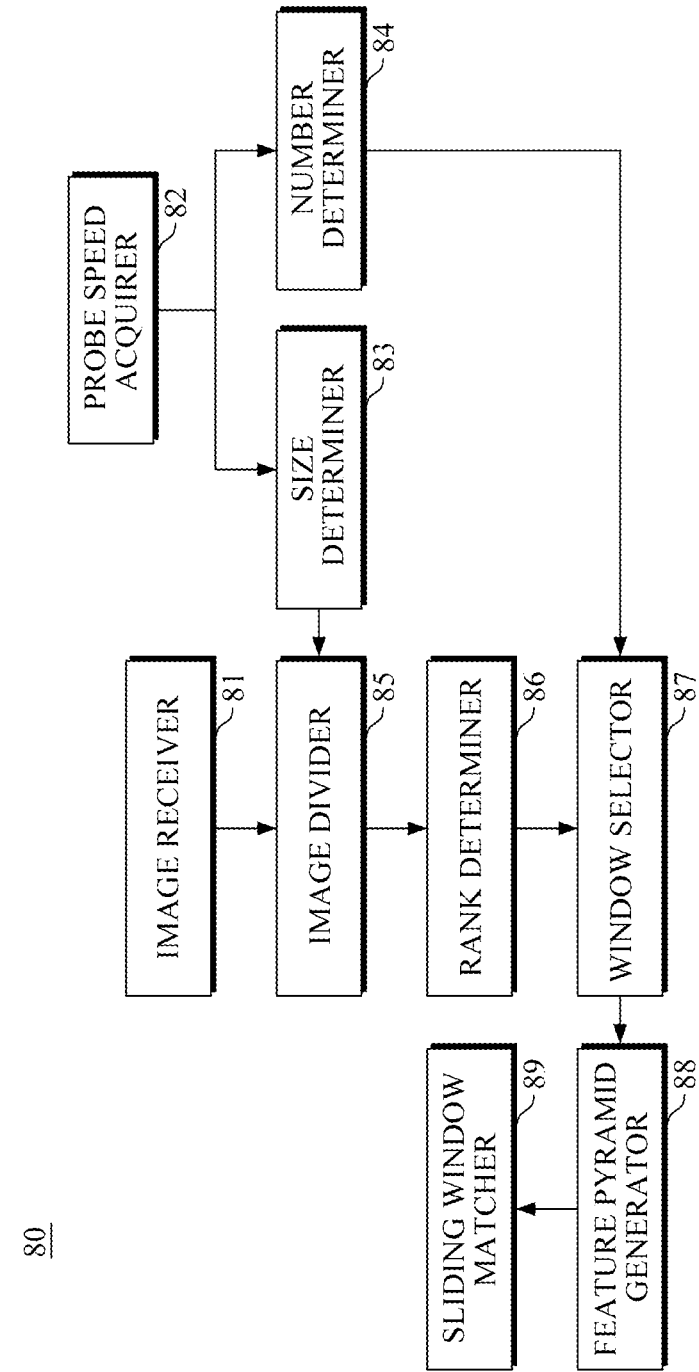
FIG. 8 is a block diagram illustrating another example of an ROI detection system.

Referring to FIG. 8, an ROI detection system 80 which includes a combination of features of the embodiments described above with references to FIGS. 3 to 7 is illustrated. The ROI detection system 80 may obtain probe speed as a selecting criterion, and determine both window size and the number of windows to be selected as a suspicious area based on the selecting criterion. After selecting one or more suspicious areas, the ROI detection system 80 may detect an ROI from each suspicious area using a sliding window technique.

The ROI detection system 80 may include components such as an image receiver 81, a probe speed obtainer or acquirer 82, a window size determiner 83, a number determiner 84, an image divider 85, a rank determiner 86, a window selector 87, a feature pyramid generator 88, and a sliding window matcher 89. Although FIG. 8 illustrates the image receiver 81, the probe speed obtainer or acquirer 82, the window size determiner 83, the number determiner 84, the image divider 85, the rank determiner 86, the window selector 87, the feature pyramid generator 88, and the sliding window matcher 89 included in the ROI detection system 80, these components may be embodied as independent hardware. Accordingly, the ROI detection system 80 illustrated in FIG. 8 is not limited thereto and thus may include more or less components.

In order to select a suspicious area from an image received from the image receiver 81, the image divider 85 divides the whole image into N number of windows of size A. The window of size A may be determined by the size determiner 83 based on a speed of an image capturing probe, which is obtained by the probe speed obtainer 82. The rank determiner 86 may determine the ranks of N number of windows according to ROI presence probabilities therefor. Then, K number of high-ranked windows among N number of windows may be selected by the window selector 87. At this point, K, which is the number of windows to be selected, is an integral number equal to or greater than 1, and may be determined by the number determiner 84 based on the speed of an image capturing probe which is obtained by the probe speed obtainer 82.

After a suspicious area composed of K number of windows, which are selected by the window selector 87, is determined, an ROI may be detected from the suspicious area. The feature pyramid generator 88 and the sliding window matcher 89 are components that detect an ROI from a suspicious area by employing a sliding window technique. The feature pyramid generator 88 generates a feature pyramid from a suspicious area. The feature pyramid includes a feature map of various sizes to detect object of various sizes. In general, a smaller-sized feature map with a higher level is used to detect a larger object. In each cell composing a feature map, a feature vector may be designated to characterize a corresponding area in an image. For example, Histograms of Oriented Gradients (HOG) may be used as a feature vector. Then, with respect to windows having a top left edge among all coordinates in a feature pyramid, scores may be made in proportion to ROI presence probabilities for the windows. The sliding window matcher 89 may detect an ROI by matching all the windows in a suspicious area with a pre-defined ROI model window.

Figure 9:
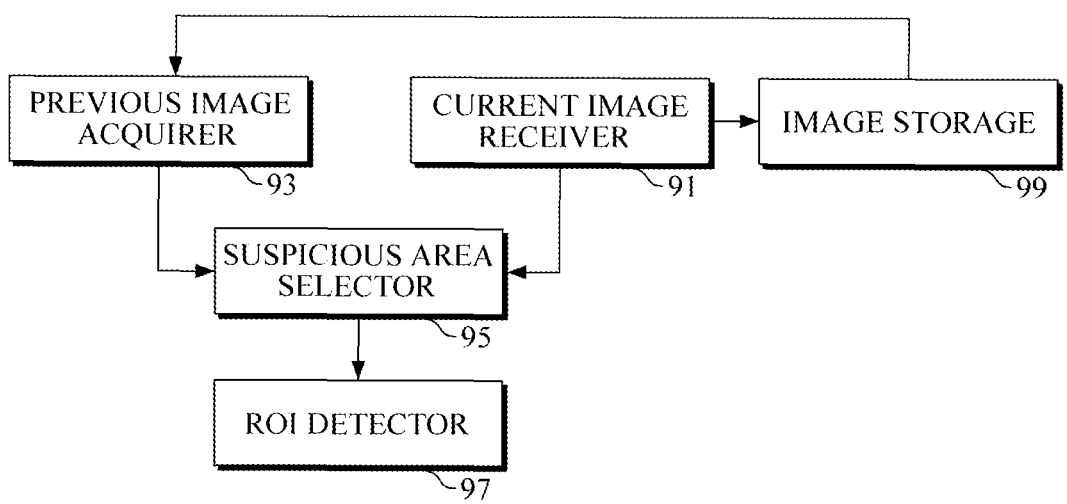
FIG. 9 is a block diagram illustrating another example of an ROI detection system.

FIG. 9 is a block diagram illustrating another example of an ROI detection system.

Referring to FIG. 9, an example of an ROI detection system 90 which uses a previous image as a selecting criterion for detecting an ROI is provided. The ROI detection system 90 may include components such as a previous image acquirer 93, a current image receiver 91, a suspicious area selector 95, an ROI detector 97, and an image storage 99. Although FIG. 9 illustrates the previous image acquirer 93, the current image receiver 91, the suspicious area selector 95, the ROI detector 97, and the image storage 99 included in the ROI detection system 90, these components may be embodied as independent hardware. Accordingly, the configuration of the ROI detection system 90 illustrated in FIG. 9 is not limited thereto and thus the ROI detection system 90 may include more or less components.

The previous image acquirer 93 is a component that obtains a previous image that was analyzed immediately before the current image, and which may be obtained from the image storage 99. Meanwhile, the current image receiver 91 is a component that receives the image to be processed at a present time (hereinafter referred to as the "current image" for the purpose of comparison with a previous image). The previous image and the current image are transmitted to the suspicious area selector 95. The current image may be transmitted to the image storage 99 so that the current image may be stored in the image storage 99.

The suspicious area selector 95 is a component that selects part of the current image based on similarity between the previous image and the current image by taking into consideration accuracy in diagnosis. The suspicious area selector 95 is described in detail with reference to FIG. 10.

Similarly to the ROI detector 17 in FIG. 1, the ROI detector 97 is a component that detects an ROI from a suspicious area selected by the suspicious area selector 95.

The ROI detection system 90 may make a user's diagnostic intention correspond to a degree of dissimilarity between the previous image and the current image (i.e., non-similarity). For example, a greater non-similarity between the previous and current images implies that a user looked over an imaged point by moving an image capturing probe quickly, so the user's diagnostic intention may be determined to be passive. Alternatively, a smaller degree of non-similarity between the previous and current images implies that a user scrutinized over a captured spot by moving an image capturing probe slowly, so the user's diagnostic intention may be determined to be active. As such, the ROI detection system 90 may identify a user's diagnostic intention based on similarities between temporal neighboring images and adapt a different annalistic process for detecting an ROI according to the user's identified diagnostic intention.

Figure 10:
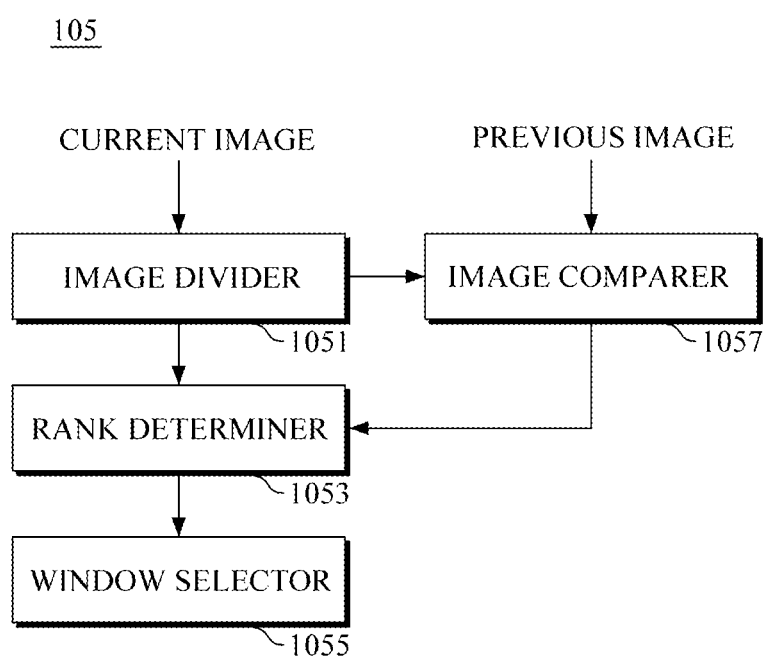
FIG. 10 is a block diagram illustrating an example of a suspicious area selector in FIG. 9.

FIG. 10 is a block diagram illustrating an example of a suspicious area selector in FIG. 9.

Referring to FIG. 10, an example of a suspicious area selector 105 that is used as a standard for determining the ranks of windows to be selected as a suspicious area, by comparing the current image with a previous image is illustrated. The suspicious area selector 105 may include components such as an image divider 1051, an image comparer 1057, a rank determiner 1053, and a window selector 1055. Although FIG. 10 illustrates the image divider 1051, the image comparer 1057, the rank determiner 1053, and the window selector 1055 included in the suspicious area selector 105, these components may also be embodied as independent hardware. Therefore, the configuration of the suspicious area selector 105 illustrated in FIG. 10 is not limited thereto and thus the suspicious area selector 105 may include more or less elements.

Similarly to the image divider 451 in FIG. 4, the image divider 1051 may divide an image into N number of windows of a predetermined size.

As the current image and a previous image are compared in the image comparer 1057, a size (e.g., the number of different pixels) of an area that is included in each of N number of windows of the current image and which are different from an area included in the previous image may be calculated, and the calculated size of the area may be referred to as a degree of dissimilarity between the previous and current images, that is, "non-similarity."

Similarly to the rank determiner 653 in FIG. 6, the rank determiner 1053 is a component that determines the ranks of N number of windows divided by the image divider 1051 from an image. However, the rank determiner 1053 is still different from the rank determiner 653 in that the rank determiner 1053 is capable of considering not just an ROI presence probability, but a comparison result of the previous and current images.

For example, in a case where any window out of N number of windows has non-similarity equal to or less than 0 (zero) or a predetermined value (e.g., 1% of the total number of windows), the rank determiner 1053 may necessarily rank any corresponding window at the bottom. Then, in a case where any window out of N number of windows has non-similarity greater than 0 or a predetermined value, the rank determiner 1053 may rank a corresponding window in proportion to a ROI presence probability therefor.

The window selector 1055 is a component that selects a predetermined number of windows as a suspicious area based on the determined ranks of windows, which are determined by the rank determiner 1053. For example, a top-ranked window or K number of high-ranked windows may be selected as a suspicious area.

According to the embodiment, a window whose similarity with a previous image is equal to or less than 0 or a predetermined value is not selected as a suspicious area, so that an area in the current image that is identical to an area included in the previous image may not be subject for an ROI detecting process.

In other words, according to this embodiment, a predetermined number of windows may be selected from among windows having areas that are different from an area included in the previous image, and an ROI may be detected from each suspicious area. Meanwhile, a window having the same area included in the previous image is not selected as a suspicious area, so that a ROI detecting process does not proceed; however, a detection result of the previous image may be reused in the following process of dividing and diagnosing a detection result.

Accordingly, for an image of relatively less similarity with a previous image thereof (i.e., an image with active diagnostic intention of scrutinizing an imaged point), it is possible to yield a diagnostic result with relatively high accuracy while it takes the same analysis time. On the other hand, for an image of relatively greater similarity with a previous image thereof (i.e., an image with passive diagnostic intention of simply looking over an imaged point), it is possible to yield a diagnostic result of a relatively low accuracy while it takes the same amount of analysis time. Therefore, it is possible to use a real-time CAD technique that is adapted according to a diagnostic intention.

Figure 11:
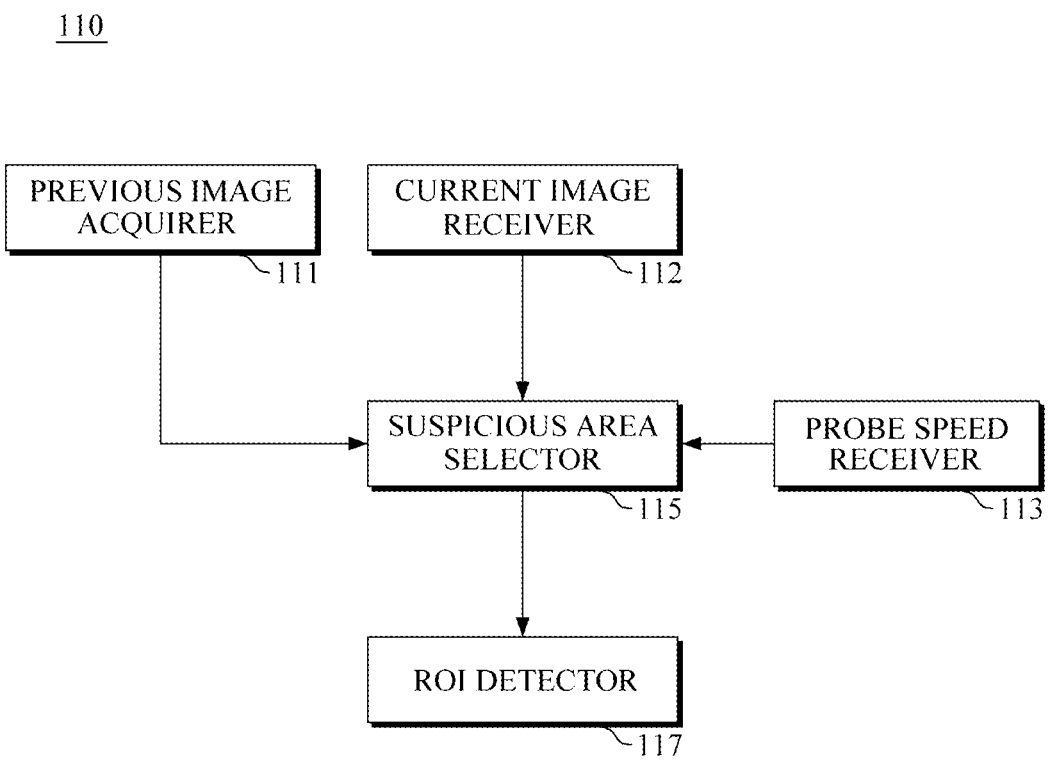
FIG. 11 is a block diagram illustrating another example of an ROI detection system.

FIG. 11 is a block diagram illustrating another example of an ROI detection system.

Referring to FIG. 11, an ROI detection system 110 that includes a combination of features of the embodiments in FIGS. 8 and 9 is illustrated. The ROI detection system 110 may obtain both probe speed and a previous image as a selecting criterion, determine both, the number of windows to be selected as a suspicious area and size therefor based on the probe speed, and determine ranks of the windows based on a comparison result of the current image and a previous image thereof. After a suspicious area is determined, the ROI detection system 110 may detect an ROI from the suspicious area using a sliding window technique. Then, in the follow-up process for real-time CAD, such as a dividing an ROI and diagnosing the ROI, not only a result of detecting an ROI from a suspicious area, but also a result of detecting an ROI from a previous image's area that is identical or similar to an area included in the current image may be re-used.

The ROI detection system 110 may include components such as a previous image acquirer 111, a current image receiver 112, a probe speed receiver 113, a suspicious area selector 115, and an ROI detector. Although FIG. 11 illustrates the previous image acquirer 111, the current image receiver 112, the probe speed receiver 113, the suspicious area selector 115, and the ROI detector 117 included in the ROI detection system 110, these components may be embodied as independent hardware. Therefore, the ROI detection system 110 illustrated in FIG. 11 is not limited thereto and thus the ROI detection system may include more or less components.

Similarly to the previous image acquirer 93 shown in FIG. 9, the previous image acquirer 11 may acquire a previous image that was analyzed and stored before the current image.

The current image receiver 112 receives an image as the current image in order to perform CAD processing that includes a process of detecting an ROI from the current image. The current image receiver 112 is similar to the current image receiver 91 shown in FIG. 9.

Similarly to the probe speed obtainer 83 shown in FIG. 8, the probe speed receiver 113 receives speed of a probe that is now capturing an image.

The suspicious area selector 115 divides the current image into N number of windows of size A, determines ranks of the windows, and selects K number of windows as suspicious areas from among N number of windows based on the determined ranks thereof.

The size A for the windows may be determined according to a probe speed received by the probe speed receiver 113. The ranks of the windows may be determined to be follows: a window at the lowest rank is determined based on dissimilarity with a previous image, and then ranks of the remaining windows are determined in proportion to ROI presence probabilities therefor. Then, K number of high-ranked windows may be selected from among N number of windows. At this point, K denotes an integral number equal to or greater than 1, and may be determined by probe speed obtained by the probe speed receiver 113.

As such, if a suspicious area is determined by the suspicious area selector 115, an ROI may be detected from the suspicious area, for example, using a sliding window technique.

Hereinafter, there are described examples of ROI detection methods with reference to FIGS. 12 to 19. However, the following ROI detection methods are merely exemplary. It may be understood for those skilled in the art that different methods with various combinations are possible. The entire or part of an ROI detection method may be encoded as computer-implementable instructions that execute a specific task in response to implementation by a processor of a computing device; modules; data; algorithms; and procedures. A computer-implementable instruction may be encoded by a software developer into a programing language, for example, BASIC, formula translator, C, C++, or the like, and then may be compiled into a machine language.

Figure 12:
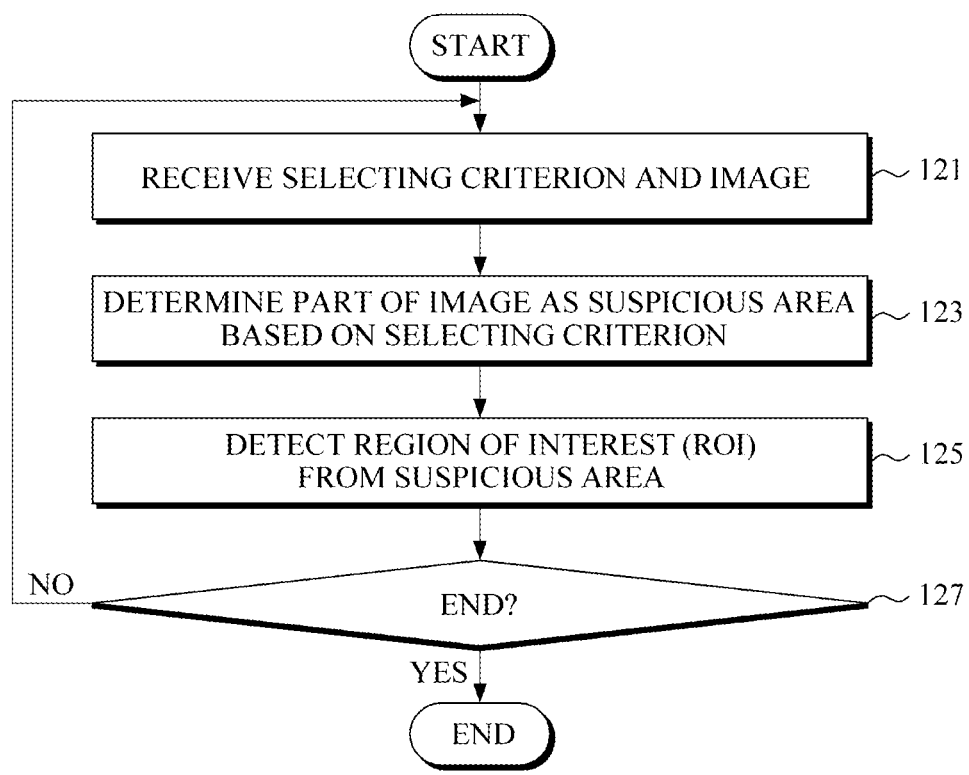
FIG. 12 is a flowchart illustrating an example of an ROI detection method.

FIG. 12 is a flowchart illustrating an example of an ROI detection method.

Referring to FIG. 12, there is provided an example of an ROI detection method 120 of detecting an ROI, which may be a part of a CAD process for detecting, dividing, and diagnosing an ROI from an ultrasonic image.

The ROI detection method 120 may start out by receiving a selecting criterion and an image in operation 121. Herein, the image may be an ultrasonic medical image used for diagnosing a specific part of a human body. There is no limitation on the selecting criterion as long as a diagnostic intention is implied. According to an embodiment, the selecting criterion may include an imaging mode designated by a user, a probe speed detected by a sensor, or a previous image.

Then, a part of the image is determined as a suspicious area based on the selecting criterion in operation 123. Herein, the image may be divided into windows. A window is a partial area of the image, and the windows may include an overlapping area. Then, a feature value indicative of an ROI presence probability may be calculated for each window. For example, a feature vector, such as HOG, or Saliency Map may be used. When ranks of the windows are determined, one or more windows may be selected based on the determined ranks therefor, and a suspicious area composed of the selected windows may be selected.

Then, an ROI is detected from the suspicious area, for example, using a sliding window technique in operation 125.

After operation 125 is completed, whether the ROI detection method 120 ends or not is checked in operation 127, and, if not, the process returns to operation 121 to receive a next image and a next selecting criterion.

As such, in the embodiment, an ROI is detected from a suspicious area that is smaller than the entire image, so that time required for analysis may be reduced. In addition, the size of a suspicious area may be adjusted by a purpose of capturing the image, that is, a user's diagnostic intention. Accordingly, it is possible to provide a diagnostic intention-adaptive ROI detection process that may implement real-time CAD to improve a user's satisfaction.

Figure 13:
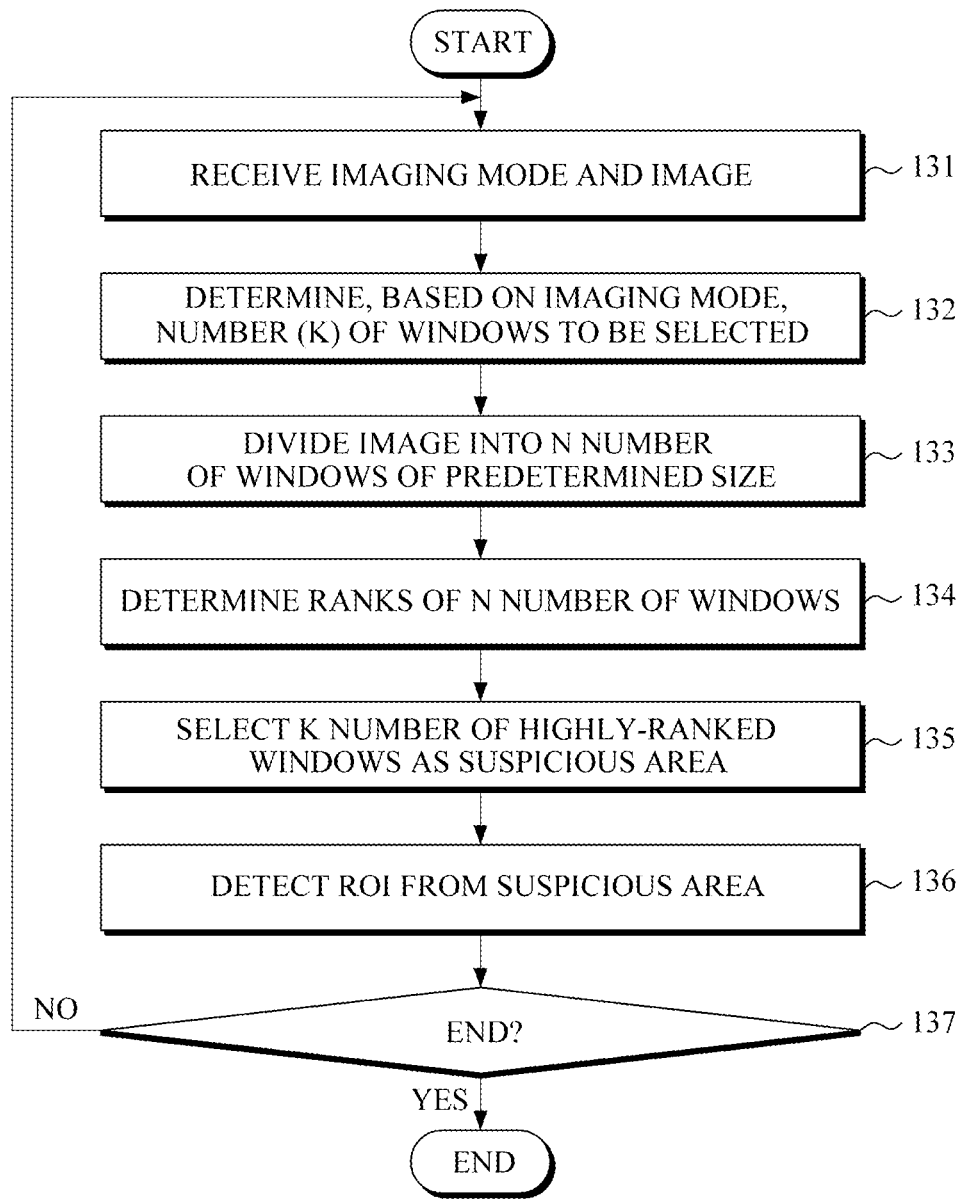
FIG. 13 is a flowchart illustrating another example of an ROI detection method.

FIG. 13 is a flowchart illustrating another example of an ROI detection method.

Referring to FIG. 13, an ROI detection method 130 of receiving an imaging mode designated by a user as a standard for selecting a suspicious area from an image is illustrated.

The method 130 may start out by receiving an imaging mode and an image in operation 131. Herein, an image may be an ultrasonic medical image used for diagnosing a specific part of a human body. The imaging mode is designated by a user, and may be information predetermined to represent a user's diagnostic intention.

Then, processes for dividing the image into windows, determining ranks of the windows, and selecting some of the windows as a suspicious area may be performed in operations 132 to 135.

First, K, which is the number of windows to be selected as a suspicious area according to an imaging mode, is predetermined based on the received imaging mode in operation 132. The number of windows to be selected as a suspicious area may be predetermined according to an imaging mode. For example, in a case of a low-density imaging mode, K may be determined to be a numeric value accounting for 10% of N number of windows according to a user's passive diagnostic intention. Alternatively, with respect to a high-density imaging mode, K may be determined to be a numeric value accounting for 60% of N number of windows according to a user's active diagnostic intention.

Simultaneously, before or after operation 132 is performed, the image is divided into N number of windows of predetermined size in operation 133. Then, a feature value indicative of an ROI presence probability is calculated for each of the windows, and ranks of the windows are determined in proportion to the ROI presence probabilities therefor in operation 134.

After the ranks of the windows are determined, K number of high-ranked windows is selected based on the determined ranks of the windows, wherein K is determined in operation 132. Then, a suspicious area composed of the selected windows is determined in operation 135.

Then, an ROI is detected from the suspicious area, for example, using a sliding window technique in operation 136.

After operation 136 is completed, whether the ROI detection method 130 ends or not is checked in operation 137, and, if not, the process may return to operation 131 to receive a next image and a next imaging mode.

Figure 14:
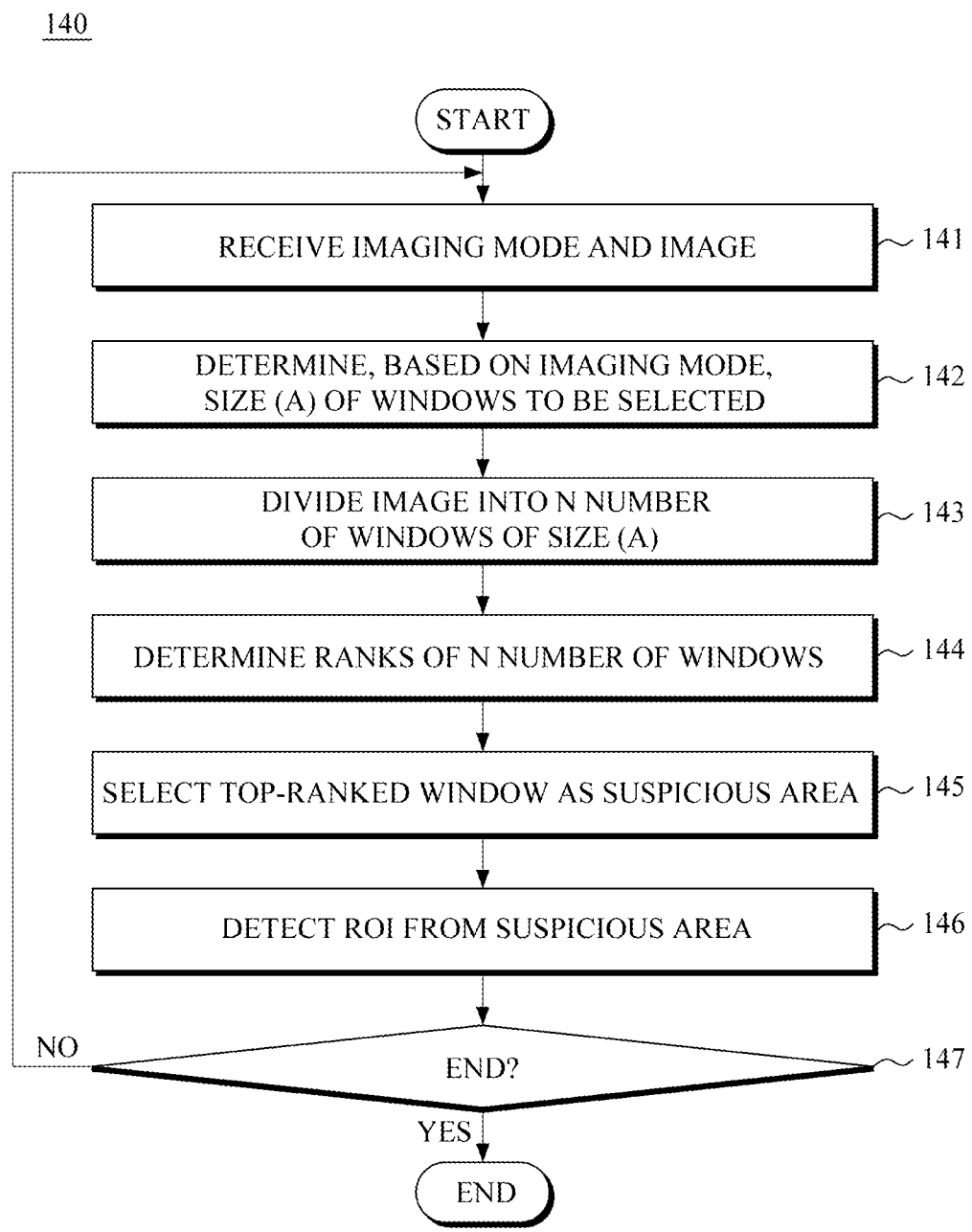
FIG. 14 is a flowchart illustrating another example of an ROI detection method.

FIG. 14 is a flowchart illustrating another example of an ROI detection method.

Referring to FIG. 14, there is provided an example of an ROI detection method 140 of receiving an imaging mode designated by a user as a selecting criterion for selecting a suspicious area from an image.

The ROI detection method 140 may start out by receiving an imaging mode and an image in operation 141. Herein, the image may be an ultrasonic medical image used for diagnosing a specific part of a human body. The imaging mode is designated by a user, and may be information predetermined to represent the user's diagnostic intention.

The size A for the windows to be divided from the image according to the imaging mode is determined in operation 142. Size for the windows to be divided from the image according to an imaging mode may be predetermined. For example, in a case of a less-density imaging mode, size A accounting for 20% of the entire image may be determined according to a user's passive diagnostic intention. Alternatively, in a case of a high-density imaging mode, size A accounting for 70% of the entire image may be determined according to a user's active diagnostic intention.

Then, the image is divided into N number of windows of size A in operation 143. Then, a feature value indicative of an ROI presence probability is determined for each of the windows, and ranks of the windows are determined in proportion to the ROI presence probabilities therefor in operation 144.

After the ranks of the windows are determined, a top-ranked window is determined as a suspicious area in operation 145.

Then, an ROI is detected from the suspicious area, for example, using a sliding window technique, in operation 146.

After operation 146 is completed, whether the ROI detection method 140 ends or not is checked in operation 147, and, if not, the process may return to operation 141 to receive a next image and a next imaging mode.

Figure 15:
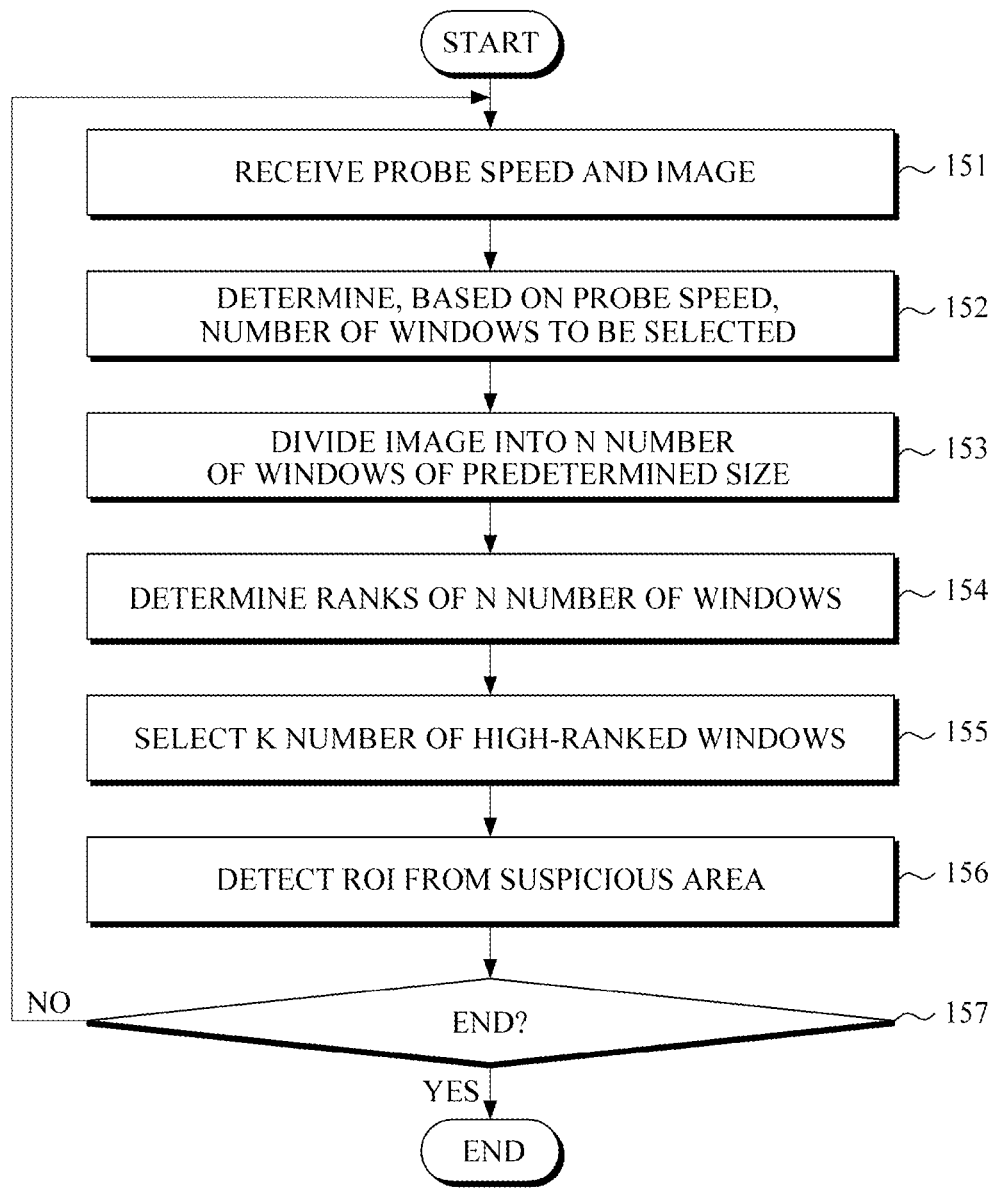
FIG. 15 is a flowchart illustrating another example of an ROI detection method.

FIG. 15 is a flowchart illustrating another example of an ROI detection method.

Referring to FIG. 15, there is provided an example of an ROI detection method 150 of receiving a probe speed automatically detected by a sensor as a standard for selecting a suspicious area from an image.

The ROI detection method 150 may start out by receiving probe speed and an image in operation 151. Herein, the image may be an ultrasonic medical image used for diagnosing a specific part of a human body. The probe speed may be a speed of an image capturing probe that the user moves using hands among ultrasonic image capturing equipment for capturing a received image. As manually determined by the user, the probe speed may indicate the user's diagnostic intention. The probe speed may be automatically detected by a motion sensor installed in the probe, such as an accelerometer or the like.

Then, processes for dividing the image into windows, determining ranks of the windows, and selecting some of the windows as a suspicious area may be performed in operations 152 to 156.

K, which is the number of windows to be divided from the image as a suspicious area, is determined based on the received probe speed in operation 152. Herein, the number of windows to be selected as a suspicious area may be predetermined. For example, in a case of a relatively high speed, K may be determined to be a numeric value accounting for 15% of N number of windows according to the user's diagnostic intention. Alternatively, in a case of a relatively low speed, K may be determined to a numeric value accounting for 70% of N number of windows according to the user's active diagnostic intention.

Simultaneously, before or after the number of windows to be selected as a suspicious area in operation 152, the image is divided into N number of windows of predetermined size in operation 153. Then, a feature value indicative of an ROI presence probability is calculated for each of the windows, and ranks of the windows is determined in proportion to the ROI presence probabilities therefor in operation 154.

After the ranks of the windows are determined, K number of high-ranked windows are selected, wherein K is determined in operation 152. Then, a suspicious area composed of the selected windows is determined in operation 155.

In operation 156, an ROI is detected from the suspicious area, for example, using a sliding window technique.

After operation 156 is completed, whether the ROI method 150 ends or not is checked in operation 157, and, if not, the process may return to operation 151 to receive the next image and the next probe speed.

Figure 16:
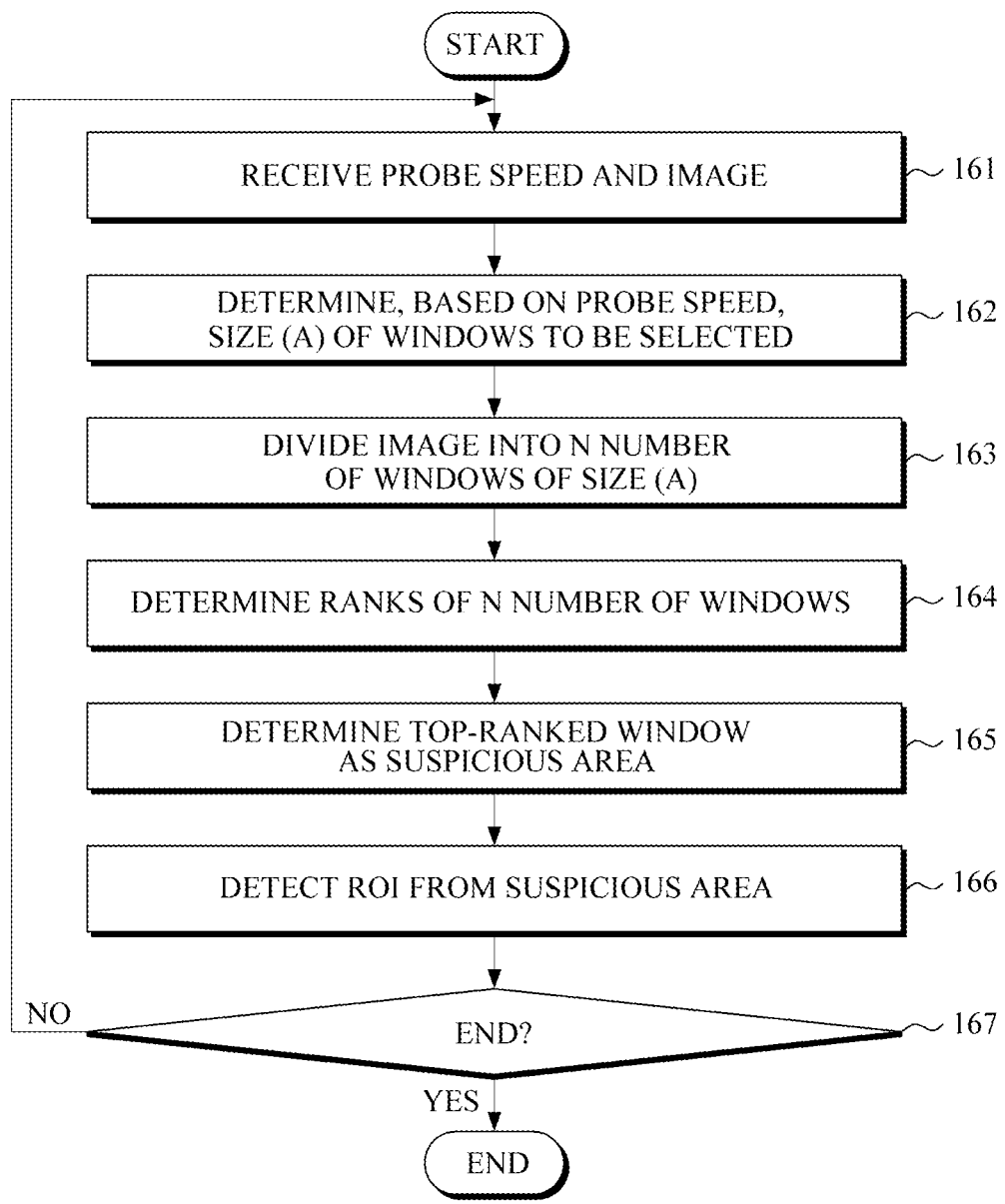
FIG. 16 is a flowchart illustrating another example of an ROI detection method.

FIG. 16 is a flowchart illustrating another example of an ROI detection method.

Referring to FIG. 16, an ROI detection method 160 of receiving a probe speed automatically detected by a sensor as a standard for selecting a suspicious area from an image is illustrated.

The method 160 may start out by receiving an imaging mode and an image in operation 161. Herein, the image may be an ultrasonic medical image to diagnose a specific part of a human body. The probe speed may be a speed of an image capturing probe that a user moves using his/her hand(s) among ultrasound image capturing equipment for capturing a received image. As manually determined by the user, the probe speed may indicate the user's diagnostic intention. The probe speed may be automatically detected by a motion sensor installed within the probe, such as an accelerometer.

The size A for windows to be divided from an image is determined based on a probe speed in operation 162. The size for windows to be divided from an image may be predetermined based on a probe speed. For example, in a case of a high speed, size A accounting for 10% of the entire image may be determined according to a user's passive diagnostic intention. In another example, in a case of a lower speed, size A accounting for 80% of the entire image may be determined according to a user's active diagnostic intention.

In operation 163, the image is divided into N number of windows of the determined size A. In operation 164, a feature value indicative of an ROI presence probability is calculated for each of the windows, and ranks of the windows may be determined in proportion to the ROI presence probabilities therefor.

After the ranks are determined, a top-ranked window is determined as a suspicious area in operation 165.

Then, an ROI is detected from the suspicious area, for example, using a sliding window technique in operation 166.

After operation 166 is completed, whether the ROI detection method 160 ends or not is checked in operation 167, and, if not, the process may return to operation 161 to receive the next image and the next probe speed.

Figure 17:
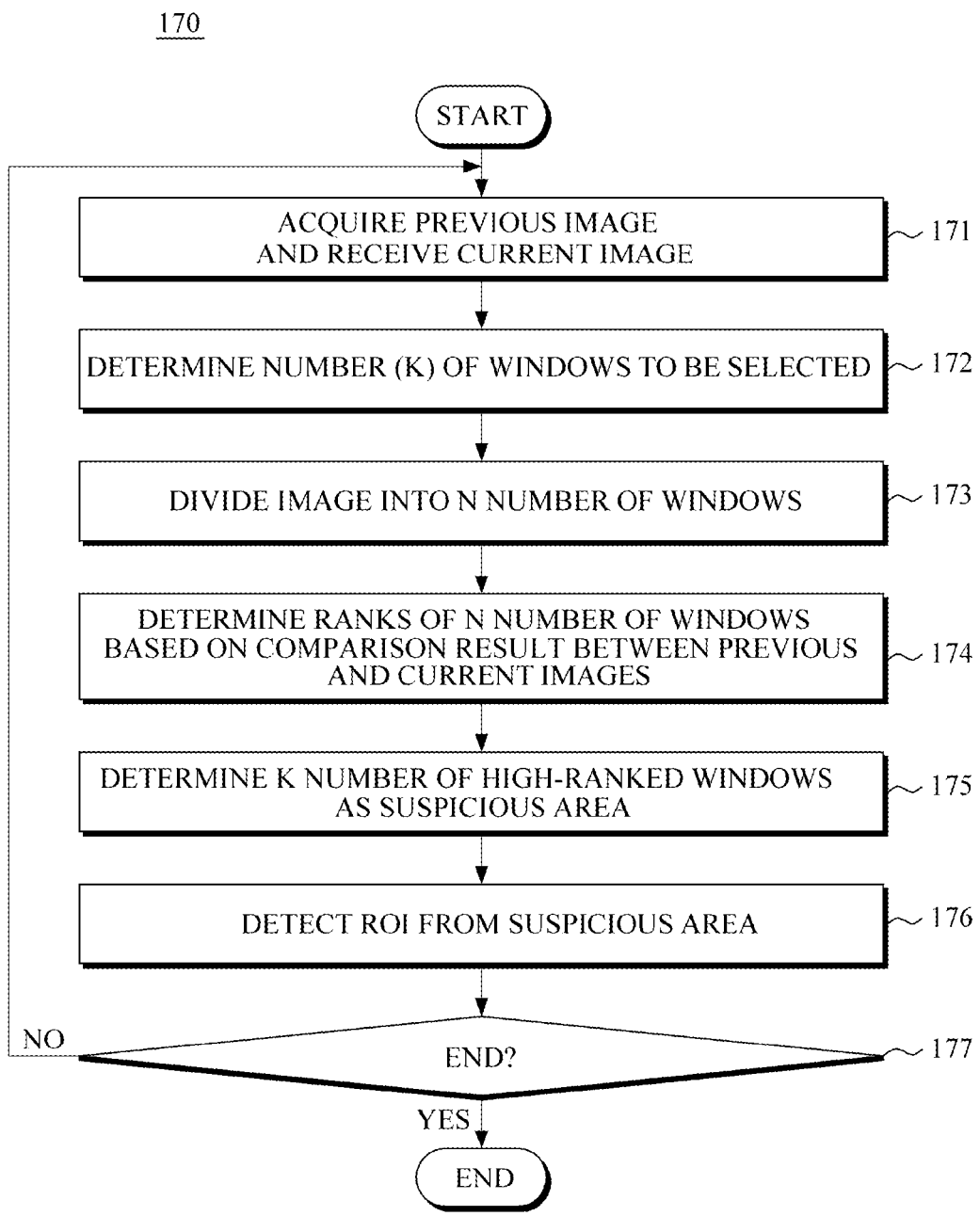
FIG. 17 is a flowchart illustrating another example of an ROI detection method.

FIG. 17 is a flowchart illustrating another example of an ROI detection method.

Referring to FIG. 17, there is provided an example of an ROI detection method 150 of acquiring a previously processed image, that is, a previous image, as a standard for selecting a suspicious area from an image. In this example, the current image is referred to as a currently processed image that is distinguished from the previous image.

The ROI detection method 170 may start out by acquiring a previous image and receiving the current image in operation 171. Herein, both of the previous image and the current image are ultrasonic medical images for diagnosing, for example, a specific part of a human body. Similarity or non-similarity between the previous image and the current image indicates how much a user is interested in diagnosing a specific spot, thereby possibly representing the user's diagnostic intention. The previous image may be acquired by storing, in a non-transitory computer-readable storage device, an image processed before the processing of the current image and reading the same by a computer processor, or the like.

Then, processes for dividing an image into windows, ranking the windows, and selecting some of the windows as a suspicious area based on a previous image may be performed in operations 172 to 176.

K, which is the number of windows to be selected as a suspicious area, is determined in operation 172. Herein, the number of windows to be selected may be determined to be the same as a numeric value stored in a data storage device, may be encoded in software, or may be designated by a user.

Simultaneously, before or after the number of windows to be selected is determined in operation 172, the image is divided into N number of windows of fixed size in operation 173. Then a feature value indicative of an ROI presence probability is calculated for each of the windows, and ranks of the windows are determined in proportion to the ROI presence probability therefor in operation 174.

After the ranks are determined, K number of high-ranked windows is selected, wherein K is determined in operation 172. Then, a suspicious area composed of the selected windows is determined in operation 175.

Then, an ROI is detected from the suspicious area, for example, using a sliding window technique in operation 176.

After operation 176 is completed, whether the ROI detection method 170 ends or not is checked in operation 177, and, if not, the process may return to operation 171 to receive/acquire the next image and a previous image of the next image.

Figure 18:
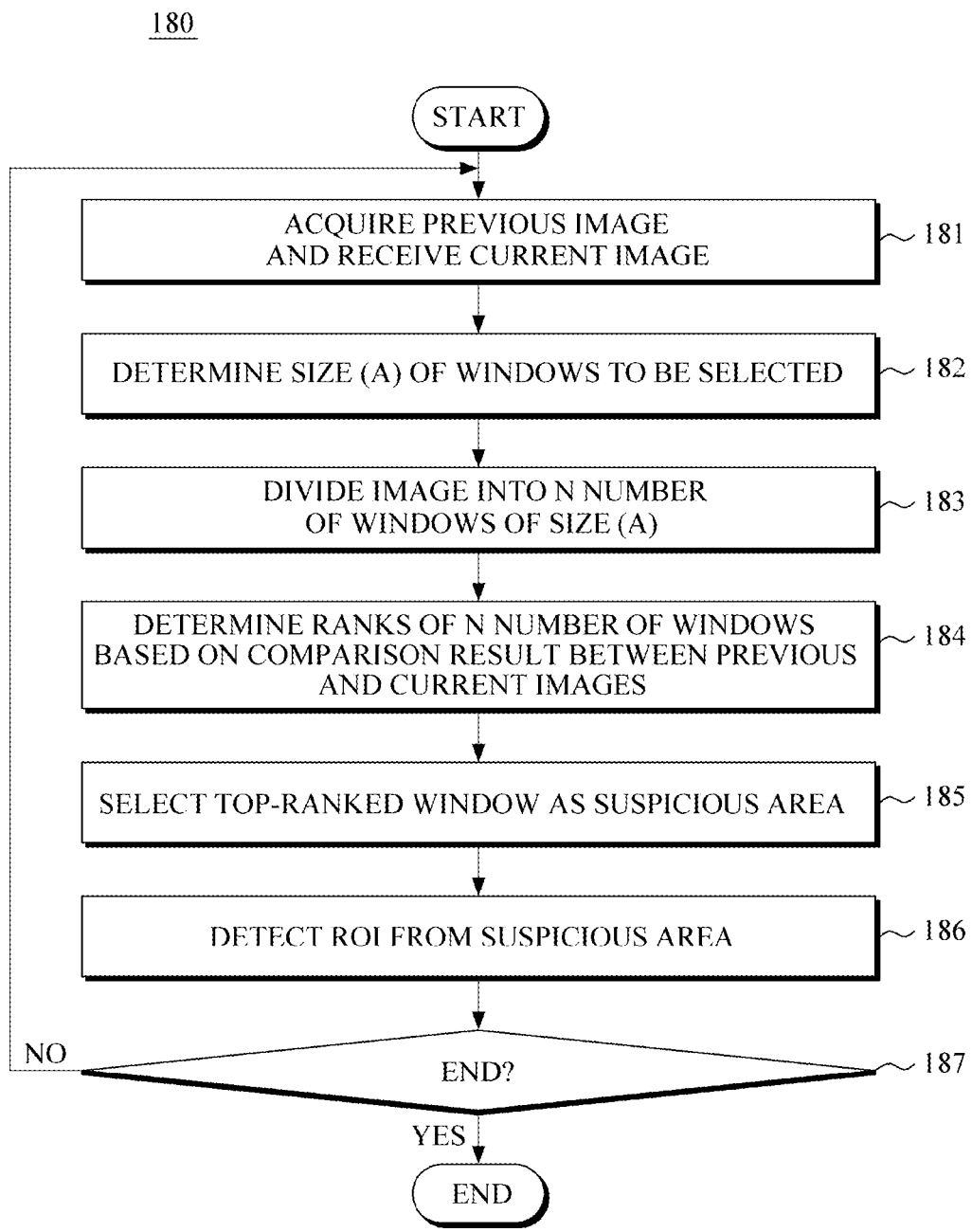
FIG. 18 is a flowchart illustrating another example of an ROI detection method.

FIG. 18 is a flowchart illustrating another example of an ROI detection method.

Referring to FIG. 18, an ROI detection method 180 of acquiring a previously processed image, that is, a previous image, as a standard for selecting a suspicious area from an image is illustrated.

The ROI detection method 180 may start out by acquiring a previous image and receiving the current image in operation 181. Herein, both of the previous image and the current image may be ultrasonic medical images for diagnosing a specific part of a human body. Similarity or non-similarity between the previous image and the current image may indicate how much a user is interested in diagnosing a specific spot, thereby possibly representing a user's diagnostic intention. The previous image may be acquired by storing, in a non-transitory computer-readable storage device, an image processed before the processing of the current image and reading the same by a computer processor, or the like.

The size A for windows to be divided from an image is determined in operation 182. A size of the windows to be divided may be determined to be the same size predetermined in a data storage device, may be encoded in software, or may be designated by a user.

Then, the image is divided into N number of windows of size A in operation 183.

In operation 184, an ROI presence probability and a comparison result of the previous image and the current image are calculated. The previous image and the current image may be compared with respect to each window. In a case where a specific window is totally identical to a corresponding area in the previous image, the specific window may be necessarily ranked at the bottom without calculation of an ROI presence probability for the specific window. Alternatively, in a case where a specific window includes an area that is different by less than 1% from a corresponding area of the previous image, the specific window may be necessarily ranked at the bottom without calculation of an ROI presence probability for the specific window. Then, a feature value indicative of an ROI presence probability is calculated for each of other windows, and ranks of the remaining windows are determined in proportion to the ROI presence probability therefor in operation 184.

After the ranks are determined, a top-ranked window is determined as a suspicious area in operation 185.

Then, an ROI is detected from the suspicious area, for example, using a sliding window technique in operation 186.

After operation 186 is completed, whether the ROI detection method 180 ends or not is checked in operation 187, and, if not, the process may return to operation 181 to receive the next image and the next imaging mode.

Figure 19:
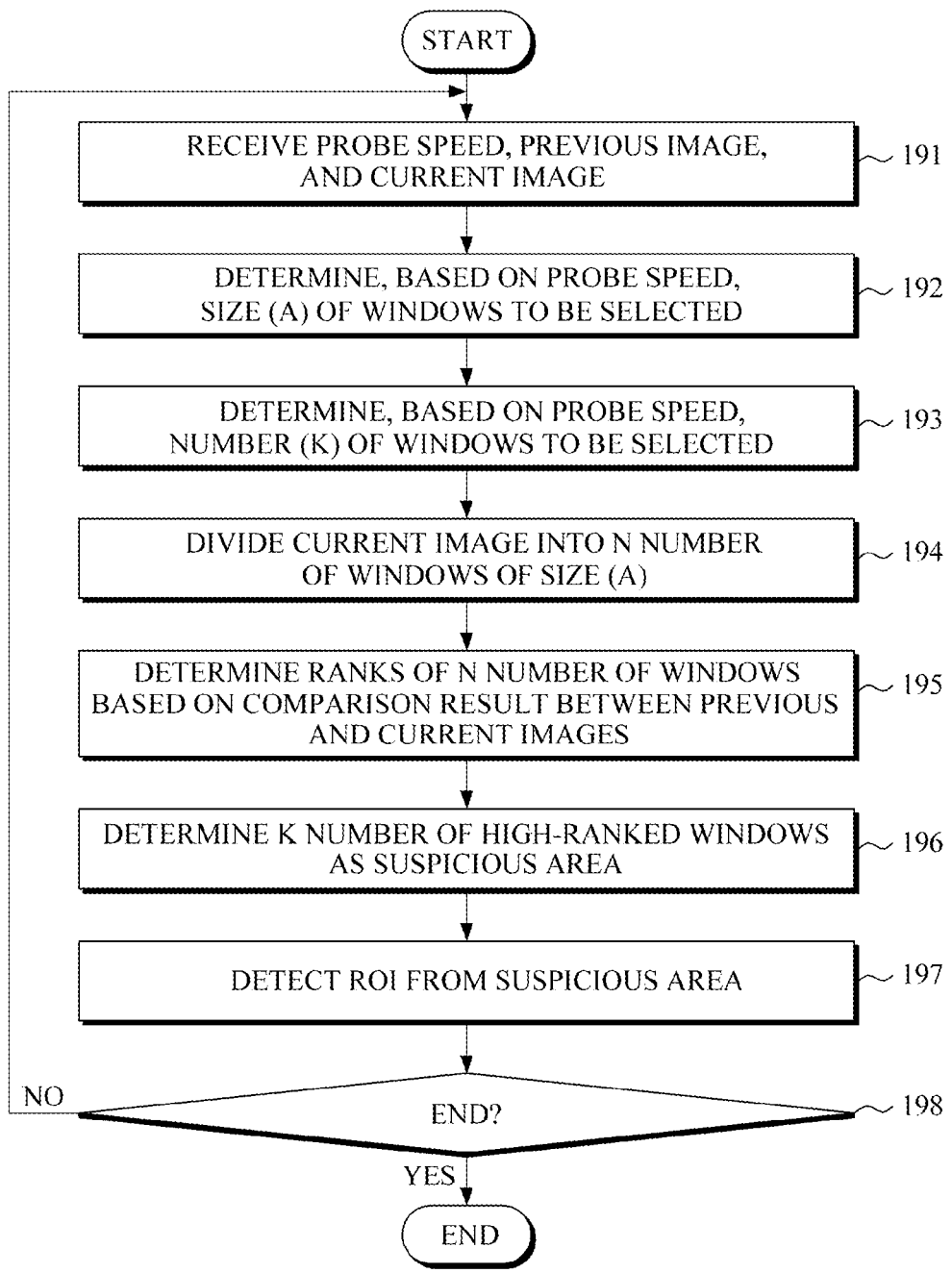
FIG. 19 is a flowchart illustrating another example of an ROI detection method.

FIG. 19 is a flowchart illustrating another example of an ROI detection method.

Referring to FIG. 19, an ROI detection method 190 of receiving a previous image and a probe speed as standards for selecting a suspicious area from an image is illustrated.

The ROI detection method 190 may start out by acquiring a previous image and receiving a probe speed and the current image in operation 191.

The size A for windows to be selected is determined based on a probe speed in operation 192. The size for windows to be selected may be predetermined based on a probe speed.

Then, K, which is the number of windows to be selected as a suspicious area, is determined in operation 193. The number of windows to be selected may be predetermined according to probe speed.

Then, the image is divided into N number of windows of predetermined size A in operation 194.

Then, ranks of N number of windows are determined in operation 195. Herein, an ROI presence probability and a comparison result of the previous image and the current image may be calculated. The previous image and the current image may be compared with respect to each window. In a case where a specific window is totally identical to a corresponding area of the previous image, the specific window may be necessarily ranked at the bottom without calculation of an ROI presence probability for the specific window. Alternatively, in a case where a specific window includes an area that is different by less than 1% from a corresponding area of the previous image, the specific window may be necessarily ranked at the bottom without calculation of an ROI presence probability for the specific window. Then, a feature value indicative of an ROI presence probability is calculated for each of the remaining windows, and ranks of the remaining windows may be determined in proportion to the ROI presence probability therefor.

After the ranks are determined, K number of high-ranked windows is determined as a suspicious area based on the determined ranks in operation 196.

Then, an ROI is detected from the suspicious area, for example, using a sliding window technique in operation 197.

After operation 197 is completed, whether the ROI detection method 190 ends or not is checked in operation 198, and, if not, the process may return to operation 191 to receive the next image, the next probe speed, and a previous image of the next image.

The methods and/or operations described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Region of Interest (ROI) detection apparatus comprising:
    a memory configured to store instructions; and
    a processor that, upon executing the stored instructions, is configured to:
        acquire an imaging mode of a plurality of imaging modes,
        determine a selecting criterion corresponding to the acquired imaging mode,
        receive a current image,
        select at least one suspicious area from a plurality of areas dividing the current image based on the selecting criterion, and
        detect at least one ROI from the selected at least one suspicious area,
    wherein the selecting criterion comprises at least one of a certain number of windows to be selected as the suspicious area or a certain size of a window for dividing the corresponding image, and
    wherein, to select the at least one suspicious area based on the selecting criterion, the processor is further configured to divide the current image to the window of the certain size, and select the certain number of windows.

2. The ROI detection apparatus of claim 1, wherein the processor is further configured to:
    provide a user with the plurality of imaging modes, and
    acquire the imaging mode based on a selection by the user.

3. The ROI detection apparatus of claim 1, further comprising:
    a motion sensor configured to sense a speed of a probe which captures the current image,
    wherein the processor is further configured to determine the selecting criterion based on the speed sensed by the motion sensor.

4. The ROI detection apparatus of claim 1,
    wherein the memory is further configured to store images that have been received before the current image, and
    wherein the processor is further configured to determine the selecting criterion based on a most recently received image of the stored images.

5. The ROI detection apparatus of claim 1,
    wherein the certain size of the window is a predetermined size, and
    wherein the processor is further configured to:
        divide the current image into a plurality of windows of the predetermined size,
        determine ranks of the plurality of windows, and
        select the certain number of windows of the plurality of windows as the at least one suspicious area based on the determined ranks of the plurality of windows.

6. The ROI detection apparatus of claim 5, further comprising:
    a motion sensor configured to sense a speed of a probe which captures the current image, and
    wherein the processor is further configured to:
        determine the selecting criterion based on the speed sensed by the motion sensor, and
        determine the certain number of windows based on the speed sensed by the motion sensor.

7. The ROI detection apparatus of claim 6, wherein the certain number of windows is in inverse proportion to the speed sensed by the motion sensor.

8. The ROI detection apparatus of claim 1,
    wherein the certain size of the window is determined based on the acquired imaging mode, and
    wherein the processor is further configured to:
        divide the current image into a plurality of windows of the determined certain size,
        determine ranks of the plurality of windows, and
        select a top-ranked window from among the plurality of windows as the at least one suspicious area.

9. The ROI detection apparatus of claim 8, further comprising:
    a motion sensor configured to sense a speed of a probe which captures the current image,
    wherein the processor is further configured to:
        acquire a speed sensed by the motion sensor, and determine the certain size based on the speed sensed by the motion sensor.

10. The ROI detection apparatus of claim 9, wherein the certain size is in inverse proportion to the speed sensed by the motion sensor.

11. The ROI detection apparatus of claim 1, wherein the processor is further configured to:
 determine the selecting criterion based on a most recently received image that has been received before the current image,
 divide the current image into a plurality of windows,
 divide the most recently received image into the plurality of windows,
 determine a non-similarity level indicative of a size of an area in the current image, the area which is dissimilar with the previous image,
 determine ranks of the plurality of windows according to the non-similarity level, and
 select at least one of the windows as the suspicious area based on the determined ranks of the plurality of windows.

12. The ROI detection apparatus of claim 11, wherein the processor is further configured to determine the ranks of the plurality of windows in a manner that a window with a non-similarity level equal to or less than 0 or a predetermined value is ranked at a bottom.

13. A method for detecting a Region of Interest (ROI), comprising:
 detecting a diagnostic intention;
 acquiring an imaging mode of a plurality of imaging modes based on the diagnostic intention;
 determining a selecting criterion corresponding to the acquired imaging mode;
 receiving a current image;
 selecting at least one suspicious area from a plurality of areas dividing the current image based on the selecting criterion; and
 detecting at least one ROI from the selected at least one suspicious area,
 wherein the selecting criterion comprises at least one of a certain number of windows to be selected as the suspicious area or a certain size of a window for dividing the corresponding image, and
 wherein, the selecting of the at least one suspicious area based on the selecting criterion comprises dividing the current image to the window of the certain size, and selecting the certain number of windows.

14. The method of claim 13, wherein the acquiring of the imaging mode comprises:
 providing a user with the plurality of imaging modes, and
 receiving a selection of one of the plurality of imaging modes.

15. The method of claim 13, further comprising:
 sensing, by a motion sensor, a speed of a probe which captures the current image, and
 determining the selecting criterion based on the sensed speed of the probe.

16. The method of claim 13, further comprising:
 storing images that have been received before the current image, and
 determining the selecting criterion based on a most recently received image of the stored images.

17. The method of claim 13,
 wherein the certain size of the window is a predetermined size, and
 wherein the selecting of the at least one suspicious area comprises:
  dividing the current image into a plurality of windows of the predetermined size,
  determining ranks of the plurality of windows, and
  selecting the certain number of windows of the plurality of windows as the at least one suspicious area based on the determined ranks of the plurality of windows.

18. The method of claim 17, further comprising:
 acquiring an image capturing probe's speed sensed by a motion sensor, and
 determining the certain number of windows based on the speed sensed by the motion sensor.

19. The method of claim 18, wherein the certain number of windows is in inverse proportion to the speed sensed by the motion sensor.

20. The method of claim 13,
 wherein the certain size of the window is determined based on the acquired imaging mode, and
 wherein the selecting of the at least one suspicious area comprises:
  dividing the current image into a plurality of windows of the determined certain size,
  determining ranks of the plurality of windows, and
  selecting a top-ranked window among the plurality of windows as the at least one suspicious area.

21. The method of claim 20, further comprising acquiring a probe's speed sensed by a motion sensor,
 wherein the certain size of the window is determined based on the speed sensed by the motion sensor.

22. The method of claim 21, wherein the certain size of the window is in inverse proportion to the speed sensed by the motion sensor.

23. The method of claim 13, further comprising:
 determining the selecting criterion based on a most recent received image that has been received before the current image, and
 wherein the selecting of the at least one suspicious area comprises:
  divide the current image into a plurality of windows,
  divide the most recently received image into the plurality of windows,
  determining a non-similarity level indicative of size of an area in the current image, the area which is dissimilar with the previous image,
  determining ranks of the plurality of windows based on the determined non-similarity level, and
  selecting one or more of the windows as the suspicious area based on the determined ranks of the plurality of windows.

24. The method of claim 23, wherein the determining of the ranks of the plurality of windows comprises determining the ranks of the plurality of windows in a manner that a window with the non-similarity level of 0 or less than a predetermined value is ranked at a lower level.

25. A detection apparatus comprising:
 an image receiver configured to receive an image;
 a memory configured to store instructions; and
 a processor that, upon executing the stored instructions, is configured to:
  detect a diagnostic intention,
  acquire an imaging mode of a plurality of imaging modes based on the diagnostic intention,
  determine a selecting parameter corresponding to the acquired imaging mode, select at least one area from a plurality of areas dividing the received image based on the selecting criterion, and detect at least one region of interest (ROI) from the selected at least one area, wherein the selecting criterion comprises at least one of a certain number of windows to be selected as the suspicious area or a certain size of a window for dividing the corresponding image, and wherein, the selecting of the at least one suspicious area based on the selecting criterion comprises dividing the current image to the window of the certain size, and selecting the certain number of windows.

26. The apparatus of claim 25, wherein the processor is further configured to:

divide the image into a plurality of windows, divide a previous image into a plurality of windows, compare the image with a previous image, determine a degree of similarity between the image and the previous image and a rank of the plurality of windows based on the similarity between the image and the previous image, and select at least one window as the selected at least one area based on the ranking determined by the processor.

* * * * *